(12) United States Patent
Hennings et al.

(10) Patent No.: US 9,740,083 B1
(45) Date of Patent: Aug. 22, 2017

(54) MOBILE DEVICE PHOTOGRAPHY APPARATUS FOR EVEN ILLUMINATION

(71) Applicant: SMPL Inc., Austin, TX (US)

(72) Inventors: Mark Thomas Hennings, Highlands Ranch, CO (US); Jeremy Cox, Austin, TX (US)

( * ) Notice: Subject to any disclaimer, the term of this patent is extended or adjusted under 35 U.S.C. 154(b) by 0 days.

(21) Appl. No.: 15/334,301

(22) Filed: Oct. 26, 2016

Related U.S. Application Data

(63) Continuation of application No. 15/294,713, filed on Oct. 15, 2016.

(51) Int. Cl.
| | | |
|---|---|---|
| *G03B 15/06* | (2006.01) | |
| *G03B 15/05* | (2006.01) | |
| *H05B 37/02* | (2006.01) | |
| *H04N 5/225* | (2006.01) | |

(52) U.S. Cl.
CPC .......... *G03B 15/05* (2013.01); *H04N 5/2252* (2013.01); *H04N 5/2256* (2013.01); *H05B 37/0227* (2013.01); *G03B 2215/0539* (2013.01); *H04M 2250/52* (2013.01)

(58) Field of Classification Search
USPC ........................................................ 396/199
See application file for complete search history.

(56) References Cited

U.S. PATENT DOCUMENTS

| | | | | |
|---|---|---|---|---|
| 4,942,685 | A * | 7/1990 | Lin ........................ | G09F 13/02 40/546 |
| 8,428,644 | B1 | 4/2013 | Harooni | |
| 9,442,346 | B2 | 9/2016 | Gantz et al. | |
| 2003/0110926 | A1* | 6/2003 | Sitrick ................. | G09B 15/023 84/477 R |
| 2009/0027874 | A1* | 1/2009 | Chang ..................... | H04M 1/22 362/88 |
| 2009/0174759 | A1* | 7/2009 | Yeh ........................ | H04N 7/142 348/14.01 |
| 2011/0195753 | A1* | 8/2011 | Mock ................... | H04B 1/3888 455/566 |
| 2012/0302294 | A1* | 11/2012 | Hammond .............. | H04M 1/18 455/567 |
| 2012/0314354 | A1* | 12/2012 | Rayner .................. | H01H 13/06 361/679.01 |
| 2013/0194775 | A1* | 8/2013 | Geddes .................. | F21V 21/30 362/11 |

(Continued)

*Primary Examiner* — Rodney Fuller
(74) *Attorney, Agent, or Firm* — Marin Patents LP; Gustavo Marin

(57) ABSTRACT

A system for evenly-scattered adaptable subject lighting for mobile device photography, comprising a case configured to enclose and securely fasten a mobile device and an illuminating portion, the illuminating portion configured to produce light based on input received from a plurality of sensors. The system further comprising a plurality of programming instructions stored in a memory and operating on a processor of a network-connected computing device, and configured to direct the operation of the illuminating portion comprising at least a sensor processor and an image capture device, wherein the sensor processor adjusts the illuminating portion based on preconfigured thresholds to provide evenly-scatter lighting for capturing images of subjects via the image capture device.

20 Claims, 17 Drawing Sheets

(56) References Cited

U.S. PATENT DOCUMENTS

| | | | |
|---|---|---|---|
| 2013/0201653 A1* | 8/2013 | Shoemake | G03B 15/02 362/3 |
| 2013/0301235 A1* | 11/2013 | Harooni | G03B 15/02 362/11 |
| 2014/0055978 A1* | 2/2014 | Gantz | A45C 11/00 362/8 |
| 2014/0340573 A1* | 11/2014 | Clawson | H04N 5/2256 348/371 |
| 2015/0050965 A1* | 2/2015 | Perry | H04M 19/048 455/567 |
| 2015/0276187 A1* | 10/2015 | Shoemake | F21V 21/00 362/235 |
| 2016/0112615 A1 | 4/2016 | Consevage et al. | |
| 2016/0224065 A1* | 8/2016 | Weldon | G06F 1/1632 |
| 2016/0230981 A1* | 8/2016 | Shoemake | H04N 7/142 |
| 2016/0277660 A1* | 9/2016 | Kaiser | G03B 17/38 |
| 2016/0305646 A1* | 10/2016 | Marcus | H05K 5/0247 |
| 2016/0309009 A1* | 10/2016 | Haskell | H04M 1/04 |
| 2016/0367194 A1 | 12/2016 | Murphy | |
| 2017/0146890 A1* | 5/2017 | Shoemake | G03B 15/05 |

* cited by examiner

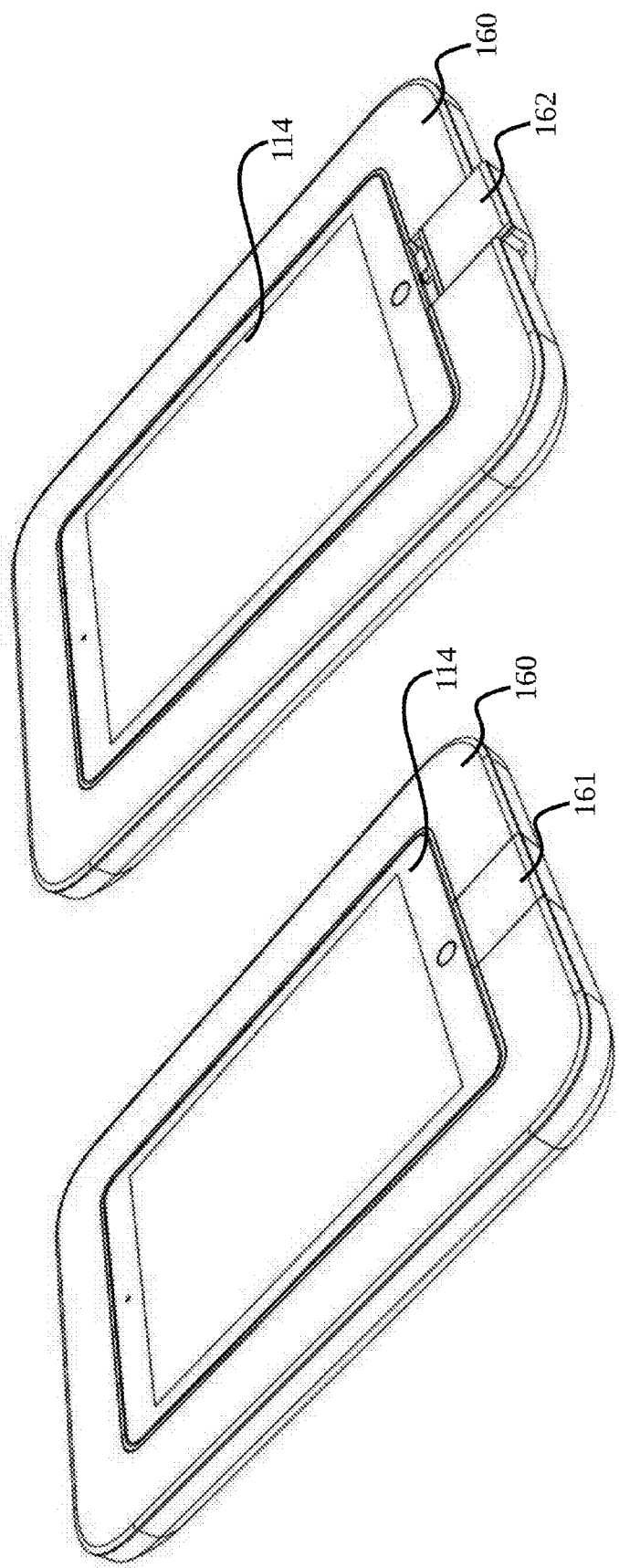

MOBILE DEVICE PHOTOGRAPHY APPARATUS FOR EVEN ILLUMINATION

CROSS-REFERENCE TO RELATED APPLICATIONS

This application is a continuation of U.S. patent application Ser. No. 15/294,713, entitled "A SYSTEM AND METHOD FOR EVENLY-SCATTERED ADAPTABLE SUBJECT LIGHTING FOR MOBILE DEVICE PHOTOGRAPHY" and filed on Oct. 15, 2016, the entire specification of which is incorporated herein by reference in its entirety.

BACKGROUND OF THE INVENTION

Field of the Art

The disclosure relates to the field of mobile device photography, and more particularly to the field of providing adequate lighting when shooting photos of a subject using a mobile device.

Discussion of the State of the Art

In recent years, people ranging from regular people to attention-seeking politicians crave a new level of self-expression via the "selfie". This is a new kind of "digital identity development" has become a new era of social communication. For that reason, whether it is via Facebook™, Instagram™, Tumblr™ or Snapchat™, the online, photo-centric generation is here to stay.

"The selfie" provides a luxury of depicting oneself in a way that she desires. Technology gives users control to shape and manipulate who they are and perhaps mask flaws and imagined shortcomings in a way that was not previously possible off-line. It has become an opportunity for people to showcase themselves to the world with little or no repercussions. So, when the "likes" and affirming responses to carefully selected selfies come in large numbers in a given week, a satisfaction of that kind of global validation is immeasurable.

Photographers using mobile devices such as smartphones or tablets are limited by the function and lighting of their mobile device or need to use additional equipment to set up an ideal photography environment, or risk lackluster results. Often this involves setting up a photo booth environment where they can control variables such as color and lighting, to best illuminate a subject and get the best image. For casual photography this is prohibitive due to time, cost, and setup involved, some turn to rental photo booths provided by a third party when needed, again at the expense of additional cost for better photos.

What is needed is a means to replicate a professional-quality photo environment using nonspecialized equipment so a photographer may utilize their existing mobile device, and that is portable and affordable for shared or public use and casual photographers.

SUMMARY OF THE INVENTION

Accordingly, the inventor has conceived and reduced to practice, in a preferred embodiment of the invention, an illuminating apparatus for mobile device photography for evenly-scattered adaptable subject lighting for mobile device photography comprising a mounting apparatus for a mobile computing device, the mounting apparatus comprising at least a front shell comprising a rigid material formed or machined to comprise at least an outer surface, an inner concave open region, an open window portion, and a toroidal illuminating ring. The illuminating ring comprises at least a rigid component encircling at least a portion of the circumference of the front shell parallel to the plane of the front shell and affixed or integrally-formed as a portion of the outer surface of the front shell at a plurality of points, and is configured to at least emit a controlled intensity of visible light and is electrically coupled to the rear shell. In some embodiments, wherein the toroidal illuminating ring fully encircles the circumference of the front shell. The front shell is releasably coupled to a rear shell comprising a rigid material formed or machined to comprise at least an outer surface and an inner concave open region. The open window portion comprises at least an open region formed or machined as a portion of the front shell, configured to pass through the outer surface of the front shell and into the inner concave open region of the front shell wherein the inner concave open regions of the front and rear shells are configured to at least partially enclose the illuminating ring and the mobile computing device when so coupled.

In some embodiments, the illuminating ring is a semi-toroidal shape. In some embodiments, the illuminating ring emits at least a controlled intensity of visible light in all directions. In some embodiments, the illuminating ring emits at least a controlled intensity of visible light only in a direction perpendicular to the plane of the ring and the front shell.

In some embodiments, the rear shell further comprises a plurality of hardware mounting fixtures wherein the plurality of hardware mounting fixtures comprises at least a VESA-compliant mounting plate. In some embodiments, the plurality of hardware mounting fixtures comprises at least a plurality of threaded mounting sockets, wherein each socket is configured to accept a threaded bolt. In some embodiments, a threaded mounting socket is configured to accept a threaded mounting bolt of a photography tripod. In some embodiments, at least a portion of the plurality of threaded mounting sockets are configured to be coupled to a VESA-compliant surface mount. In a preferred embodiment, a plurality of hardware sensors, wherein the controlled light emission of the illuminating portion is controlled at least in part by at least a portion of the plurality of hardware sensors. In some embodiments, the plurality of hardware sensors may comprise a touch sensor, a light sensor, a camera whereby measurements of the environment may be taken including, but not limited to, an overall color cast of the visible environment, identify a human subject within the visible environment, measure a skin tone of the human subject, measure at least a plurality of visual background characteristics of the environment behind the human subject, and the like.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 1G is an illustration of an exemplary hardware configuration of an apparatus for evenly-scattered adaptable subject lighting for mobile device photography, illustrating a removable cable connector housing in a closed configuration.

FIG. 1H is an illustration of an exemplary hardware configuration of an apparatus for evenly-scattered adaptable subject lighting for mobile device photography, illustrating a removable cable connector housing in a partially open configuration.

DETAILED DESCRIPTION

Figure 1A:
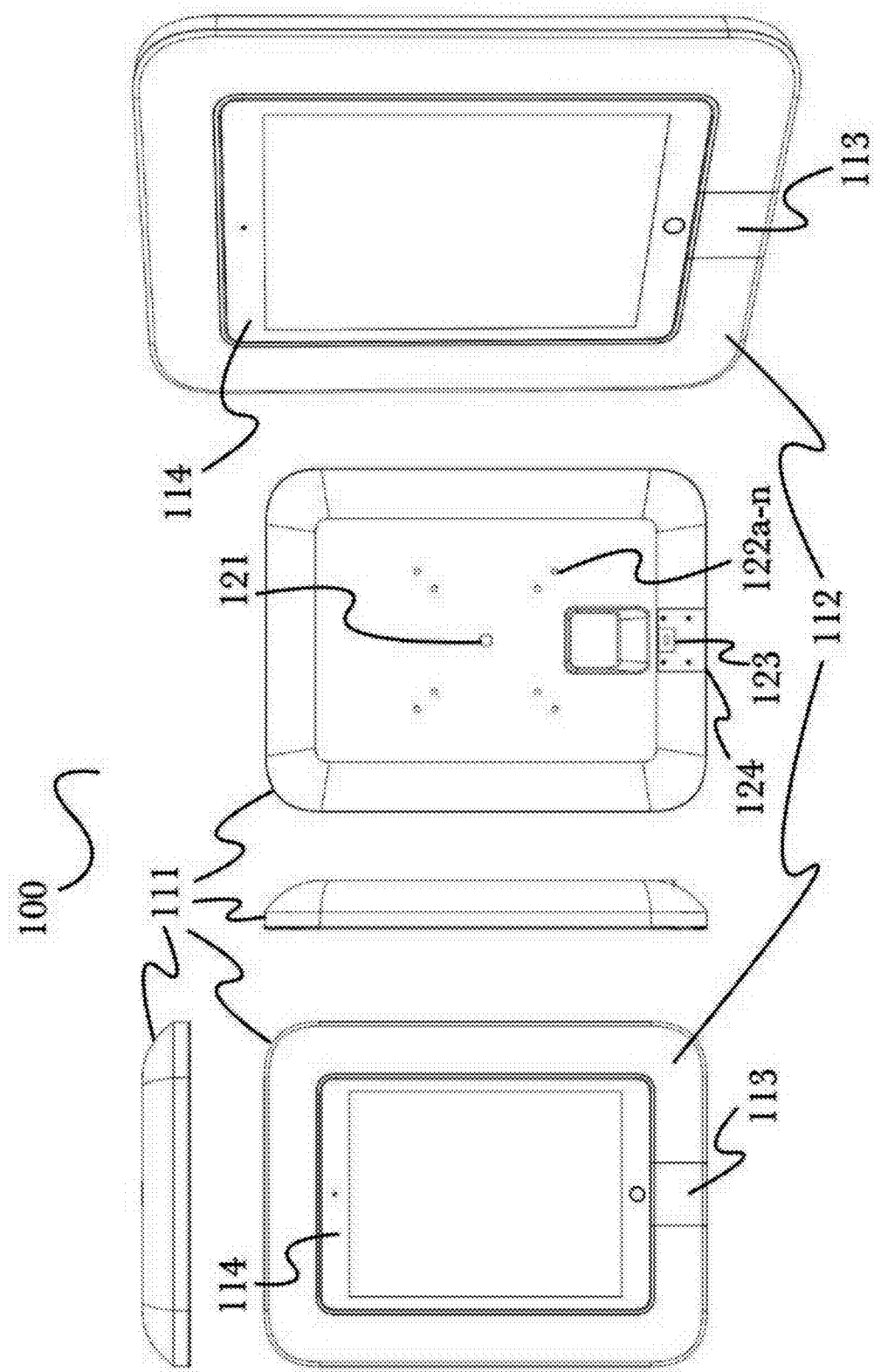
FIG. 1A is an illustration of multiple views of an exemplary hardware arrangement of an apparatus for evenly-scattered adaptable subject lighting for mobile device photography, illustrating the use of a mobile device enclosure with integral illuminating portion according to a preferred embodiment of the invention.

The inventor has conceived, and reduced to practice, in a preferred embodiment of the invention, an apparatus for adaptable evenly-scattered subject lighting for mobile device photography.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

The term "photographer", as used herein, refers to an operator of a photography device. It does not imply a user of any skill level or having any special education.

Detailed Description of Exemplary Embodiments

FIG. 1A is an illustration of multiple views of an exemplary hardware arrangement of an apparatus 100 for evenly-scattered adaptable subject lighting for mobile device photography, illustrating the use of a mobile device enclosure 111 with integral illuminating portion 112 according to a preferred embodiment of the invention. According to the embodiment, apparatus 100 may comprise a case or enclosure 111 for a mobile device such as a tablet 114 or other mobile device (for example, including but not limited to a smartphone, laptop or convertible personal computer, media recorder or player device, or other portable electronic device) may be used to securely contain and enclose mobile device 114 while still permitting access to common functions such as a touchscreen or hardware buttons that may be on the device casing (for example, on the front of the front or sides of the device). It should be appreciated that various particular arrangements of a case 111 may be utilized for different mobile devices 114, and that different arrangements may be utilized to permit or restrict access to certain functions, such as to prevent users from accessing a power switch or volume controls, or to prevent removal of a device battery.

Case 111 may comprise a locking mechanism such as a mechanical sliding portion 113 configured to secure a mobile device 114 in place when fastened. Case 111 may also comprise a port connector integrally formed or affixed within or upon sliding portion 113 to connect to a power, data, or other port integral to mobile device 114, such as to allow mobile device 114 to be charged while secured, or to permit pass-through access to other hardware ports such as audio or video inputs or outputs, or to provide external accessory functionality via a data port such as to provide additional hardware sensors (for example, light sensors for use in determining an appropriate configuration for an illuminating portion 112). In this manner, mobile device 114 may be securely fastened without restricting function, by permitting access to hardware ports and other functions without removing from case 111.

Case 111 may further comprise an illuminating portion 112, that may be configured as, for example, a ring or border surrounding mobile device 114. Illuminating portion 112 may be configured as an entire surface of case 111 as shown, or may be an affixed or integrally-formed portion of case 111, for example an extruded ring (as described below with reference to FIG. 1B), rectangle, or other shape configured to provide directional or scattered light when illuminated, and optionally configured for use as a brace, handle, mount, or other structural component for various use. In this manner, portions of case 111 may be used in a dual-purpose manner, as both structural components as well as lighting elements for use in providing evenly-scattered adaptable subject lighting for mobile device photography. Additionally, illuminating portion 112 may be constructed using a variety of materials, shapes, or techniques to achieve a particular desired lighting quality, such as the use of LED light elements for programmable color variance, incandescent lighting elements to more closely replicate natural light conditions, the use of smooth or curved surface shapes or contours to direct or scatter light as desired, or the use of Fresnel or other lens designs to further direct light as needed during use. Additionally, by using a mobile device 114, hardware and software capabilities such as sensors and specialized software applications may be used to further enhance photography. For example, device sensors may be used to detect ambient light conditions or image qualities such as (for example, including but not limited to) an individual's clothing, hair, or skin tone, the color or shape of an inanimate subject such as for photographing objects, or background characteristics (such as color, texture, complexity, or distance) behind a subject. This data may be used to adjust lighting effects to optimize photo quality, for example by altering the color or intensity of subject lighting to achieve a desired result. This process may be automated using hardware sensors in a case 111 or mobile device 114 according to various arrangements, as discussed in greater detail below with reference to FIG. 2, or may be at least partially manual via interaction with a software application as described in FIG. 3, for example so that a user may select photography effects to apply.

Case 111 may comprise a plurality of attachment points 122a-n such as (for example) threaded holes, sockets, hooks, mating surfaces, or other points for mechanical attachment to a variety of surfaces or fixtures. As shown, attachment points 122a-n may comprise a plurality of threaded holes arranged to comply with common mounting hardware standards, such as Video Electronics Standards Association (VESA™)-compliant arrangements for use with common mounting plates and wall fixtures for television and video display hardware. It may be appreciated that any mounting standard may be used such as Flat Display Mounting Interface (FDMI™), VESA™ MIS-D 100/75, VESA™ MIS-E, VESA™ MIS-F. Additionally, a plurality of specific mounting points 121 may be used to accept common photography hardware, such as a tripod or stand. A locking mechanism 123 may also be utilized, for example to accept 124 a standardized mobile device lock such as a Kensington Device, to prevent theft of a mounted mobile photography apparatus. In some embodiments, adapter mating portions may available to accept an adapter interface to add, for example, a VESA™-compliant interface (not shown) to case 111.

Figure 1B:
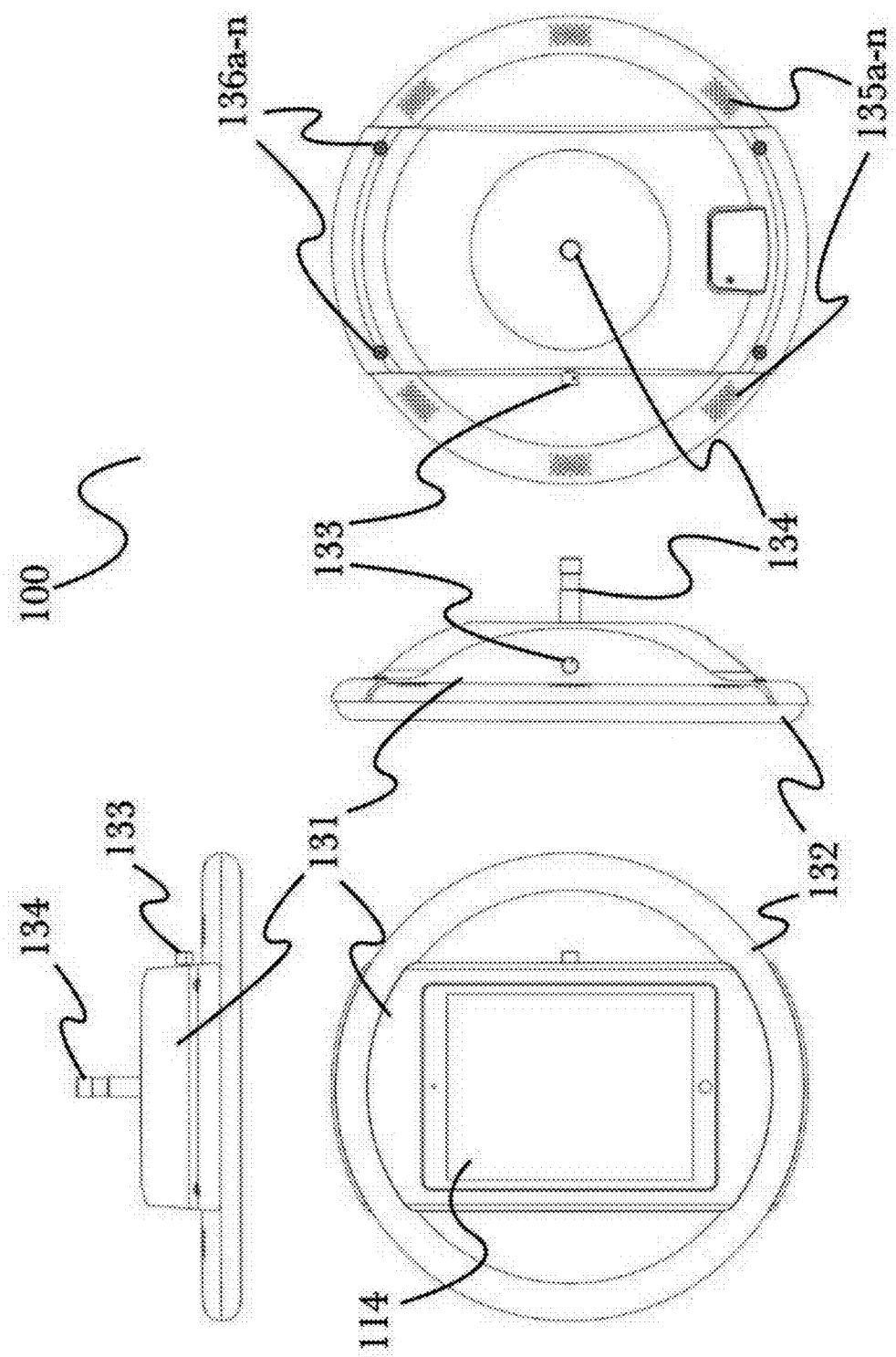
FIG. 1B is an illustration of multiple views of an alternate exemplary hardware arrangement of an apparatus for evenly-scattered adaptable subject lighting for mobile device photography, illustrating the use of a mountable mobile device apparatus with circular illuminating portion according to a preferred embodiment of the invention.

FIG. 1B is an illustration of multiple views of an alternate exemplary hardware arrangement of an apparatus for evenly-scattered adaptable subject lighting for mobile device photography, illustrating the use of a mountable mobile device apparatus with circular illuminating portion 132 according to a preferred embodiment of the invention. According to the embodiment, a ring, torus-shaped, or in some embodiments a semi-torus-shaped illuminating portion 132 may be affixed to a mobile device 114, such as by being affixed to or integrally formed as a portion of a device mount or enclosure 131. Enclosure 131 may optionally be of varied hardware design, for example comprising features of a mobile device case 111 as described above, such as access to features or hardware buttons that may be on a mobile device casing, as well as incorporating retention or locking mechanisms such as threaded screws 136a-n for assembling and securing front portion 131a and back portion 131b of enclosure 131 (as in FIG. 1C) or bolts 133 for securing mobile device 114 to construct enclosure 131 or adjusting its position or alignment (for example, to align the bezel of a screen or to provide ideal access for hardware functions, or to adjust the position while mounted to an external device, structure, or attachment), or a variety of mounting hardware such as including (but not limited to) plates or mating interfaces for FDMI™, VESA™ MIS-D 100/75, VESA™ MIS-E, VESA™ MIS-F, or standardized mounting points 134 for photography stands such as a monopod, tripod, or flexible mount or attachment (such as for attaching or stabilizing a device on an uneven surface or on a wall or object), or others. It should be appreciated that enclosure 131 comprises a joined front portion 131a and back portion 131b (as in FIG. 1C) whereby circular illuming portion 132 is securely held between front portion 131a and back portion 131b by fasteners 136a-n. In some embodiments, enclosure 131, when fastened, includes at least a portion of circular illuminating portion 132. Enclosure 131 may further comprise a plurality of hardware speakers 135a-n, that may be used to relay audio output from a secured mobile device 114 such as by pairing via BLUETOOTH™ or similar wireless communication means, or by connecting to a hardware output port of mobile device 114 when installed. In some embodiments, the plurality of audio speakers 135a-n may be encased within circular illuming portion 132 similarly to above.

Figure 1C:
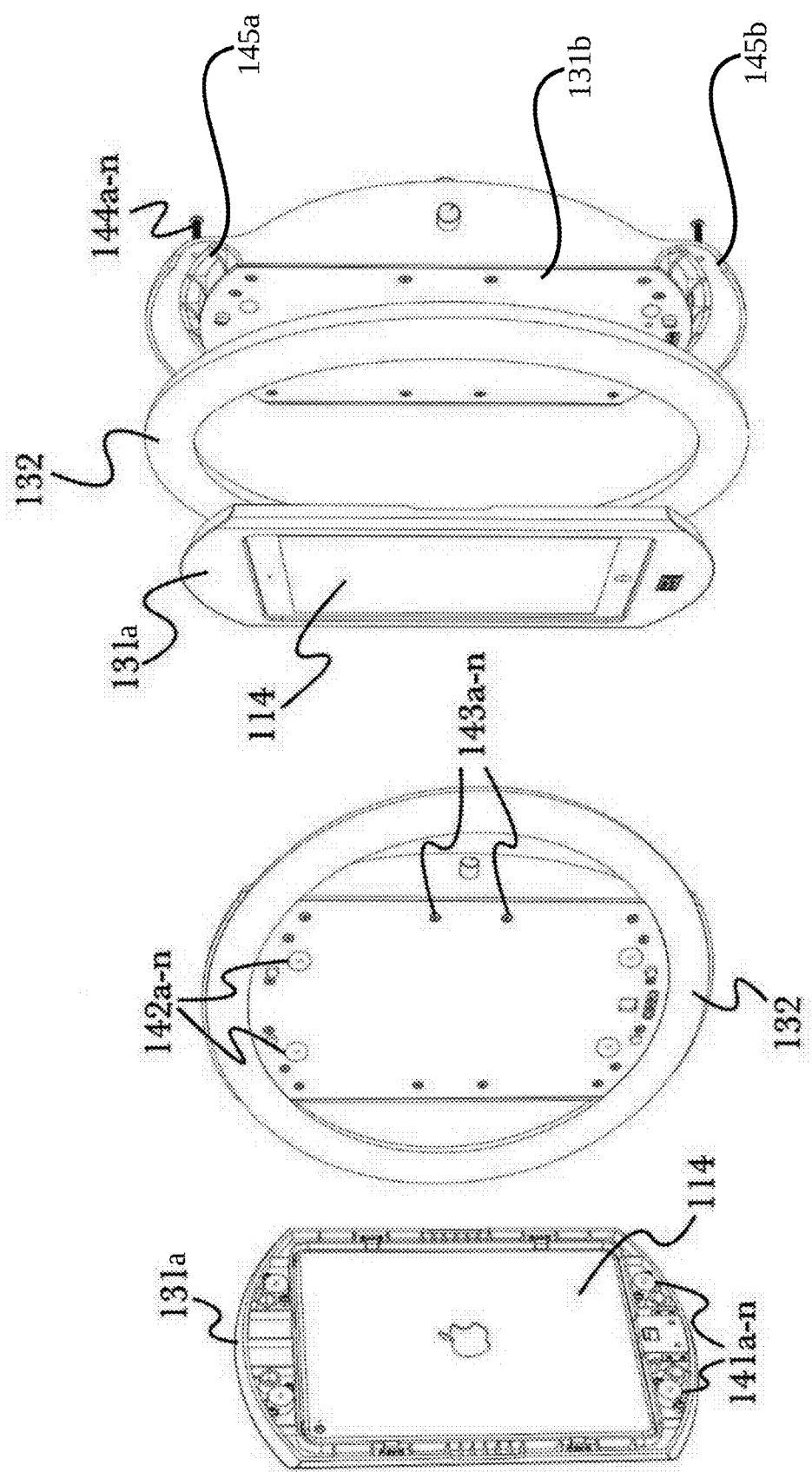
FIG. 1C is an illustration of an exemplary construction and interior view of an apparatus for evenly-scattered adaptable subject lighting for mobile device photography, according to a preferred embodiment of the invention.

FIG. 1C is an illustration of an exemplary construction and interior view of an apparatus for evenly-scattered adaptable subject lighting for mobile device photography, according to a preferred embodiment of the invention. According to the embodiment, a mobile device 114 may be secured within an enclosure 131 (made up front portion 131a, back portion 131b and illuminating portion 132) while offering adequate protection to mobile device 114 against damage during use, and providing for access to physical functions such as viewing the screen or accessing hardware buttons or controls while secured. In some embodiments, illuminating portion 132 may be a toroidal light emitting device. In some embodiments illuminating portion 132 may be a semi-toroidal concavity comprising a flat back (for example to provide ease of connection to back portion 131b). In a preferred embodiment, illumination portion 132 slidably engages or fastens into mating portions 145a and 145b. In some embodiments 132 snaps into mating portions 145a and 145b, in other embodiments a faster is used, such as a plurality of screws, bolts, hook and loop, and the like. In other embodiments, illumination portion 132 may be held securely in-place between a top edge and a lower edge of front portion 131a when front portion 131a is fastened to back portion 131b. Further, a variety of fastener types may be used to secure mobile device 114 within enclosure 131 and to assemble enclosure 131 for use including (but not limited to) mating magnetic fasteners having opposed north 141a-n and south 142a-n diamagnetic poles to secure enclosure 131 when aligned, or a plurality of threaded holes or sockets 143a-n for use with fastening screws or bolts 144a-n to mechanically secure enclosure 131 during assembly. In this manner a mobile device 114 may be secured in a permanent or semi-permanent manner according to a desired use case or arrangement, to optionally provide for enhanced security and protection or to provide convenience for rapidly securing and removing a mobile device 114 as needed. These and other various fastening means may also be used to provide for a sufficiently stable alignment of mobile device 114 both within enclosure 131 as well as relative to a mounting surface, structure, or device (such as via a tripod mount 134 as described above in FIG. 1B, for example) to provide a stable platform for mobile photography, as excessive movement may impede the quality of photographs or video. According to the embodiment, illuminating portion 132 may comprise a formed portion of enclosure 131 constructed of a transparent or translucent material, to allow light from a light source to shine through. The light source may comprise a plurality of lighting elements including, but not limited to, LEDs, electroluminescent (EL) wire, a low pressure mercury-vapor gas-discharge lamp, incandescent bulbs, compact fluorescent bulbs, halogen bulbs, or other illuminating materials, configured to emit light optionally in preset or configurable frequencies and intensities (for example, some arrangements may utilize programmable LEDs that can change color or brightness via a software application). By carrying the material properties of illuminating portion 132 such as thickness, color, or opacity, various lighting properties may be achieved for various use cases or to accommodate different photography conditions such as background colors or ambient lighting. In some embodiments, illumination portion 132 may emit at least a controlled intensity of visible light only in a direction perpendicular to the plane of the ring and the front shell or into some other specific direction.

Figure 1D:
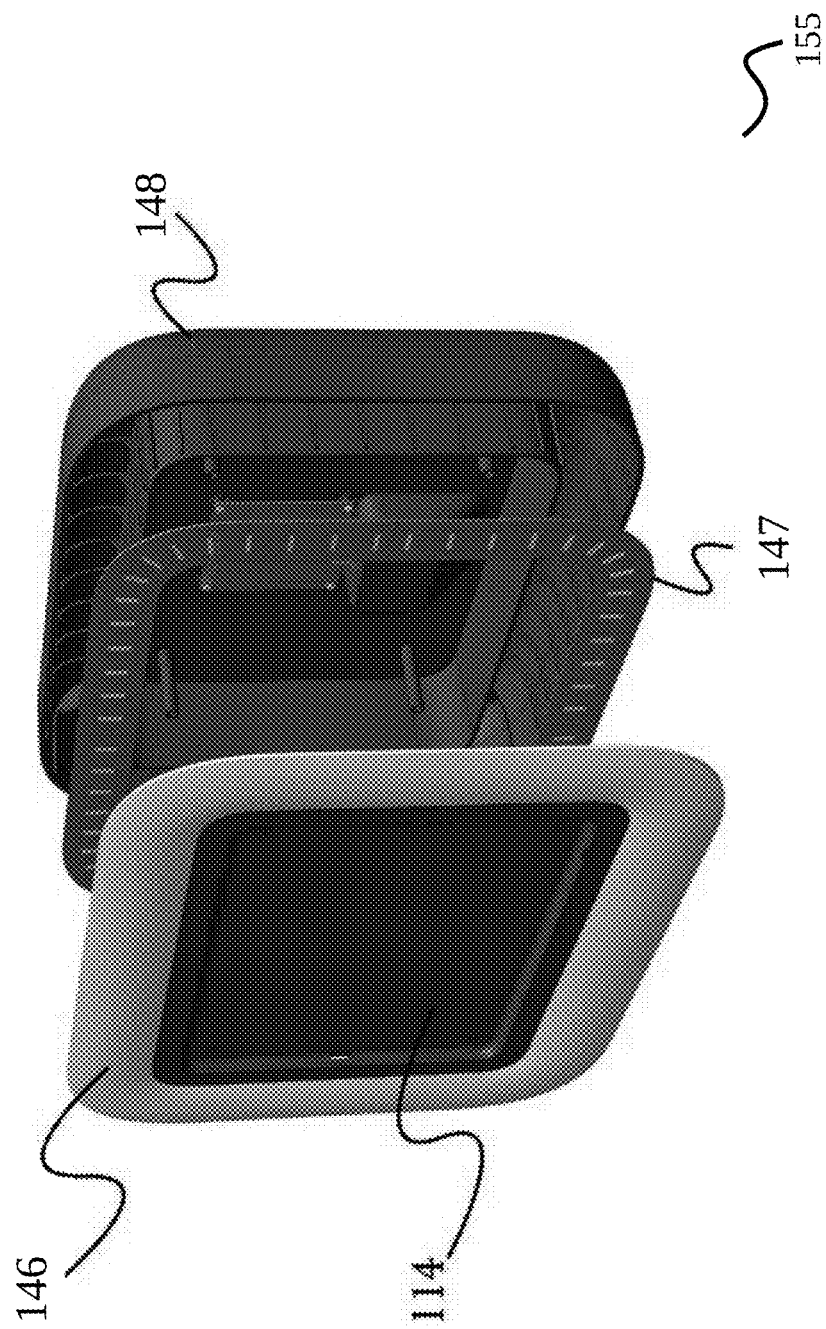
FIG. 1D is an illustration of an exemplary hardware configuration of an apparatus for evenly-scattered adaptable subject lighting for mobile device photography, illustrating construction using a snap-fit clamshell configuration.

FIG. 1D is an illustration of an exemplary hardware configuration of an apparatus for evenly-scattered adaptable subject lighting for mobile device photography, illustrating construction using a snap-fit clamshell configuration. According to the embodiment, an enclosure 155 (as in FIG. 1F) which may comprise a clamshell-type construction by connecting front portion 146, middle portion 147, and back portion 148. In this regard, a mobile device 114 may be secured within enclosure 155 during assembly to provide a secure casing around mobile device 114. As shown, middle portion 147 may be an illuminating portion that may comprise a formed portion of enclosure 155 constructed of a transparent or translucent material, to allow light from embedded illumination elements within middle portion 147 to shine through. Illuminating middle portion 147 may comprise embedded illumination elements including, but not limited to, LEDs, electroluminescent (EL) wire, a low pressure mercury-vapor gas-discharge lamp, incandescent bulbs, compact fluorescent bulbs, halogen bulbs, or other illuminating materials (or any combination thereof), configured to emit light optionally in preset or configurable frequencies and intensities, configured to emit light optionally in preset or configurable frequencies and intensities. In some arrangements configurations of the light may utilize programmable LEDs that can change color or brightness via a programmable instructions running on a processor and may use hardware sensors as described in this application. By carrying the material properties of illuminating portion 132 such as thickness, color, or opacity, various lighting properties may be achieved for various use cases or to accommodate different photography conditions such as background colors or ambient lighting. In some embodiments enclosure 155 may comprise a mounting apparatus for securely encasing a mobile computing device within a front portion 146, the mounting apparatus comprising at least: a front shell comprising a rigid material formed or machined to comprise at least an outer surface, an inner concave open region, an open window portion, and an illuminating portion; a rear shell comprising a rigid material formed or machined to comprise at least an outer surface and an inner concave open region wherein the open window portion may comprise at least an open region formed or machined as a portion of the front shell configured to pass through the outer surface of the front shell and into the inner concave open region of the front shell. The illuminating portion may comprise at least a portion of the outer surface of the front shell and may be configured to at least emit a controlled intensity of visible light from the embedded illuminating elements as described above. The front shell and the rear shell may configured to be releasably coupled to each other using a variety of fasteners such as screws, snaps, hook and loop, and other fasteners. The resulting case 155 comprises the inner concave regions of the front and rear shells and may at least partially enclose the mobile computing device when so coupled. It can be appreciated that by having concave regions allows for hardware sensors to be accommodated within the case for security and convenience.

Figure 1E:
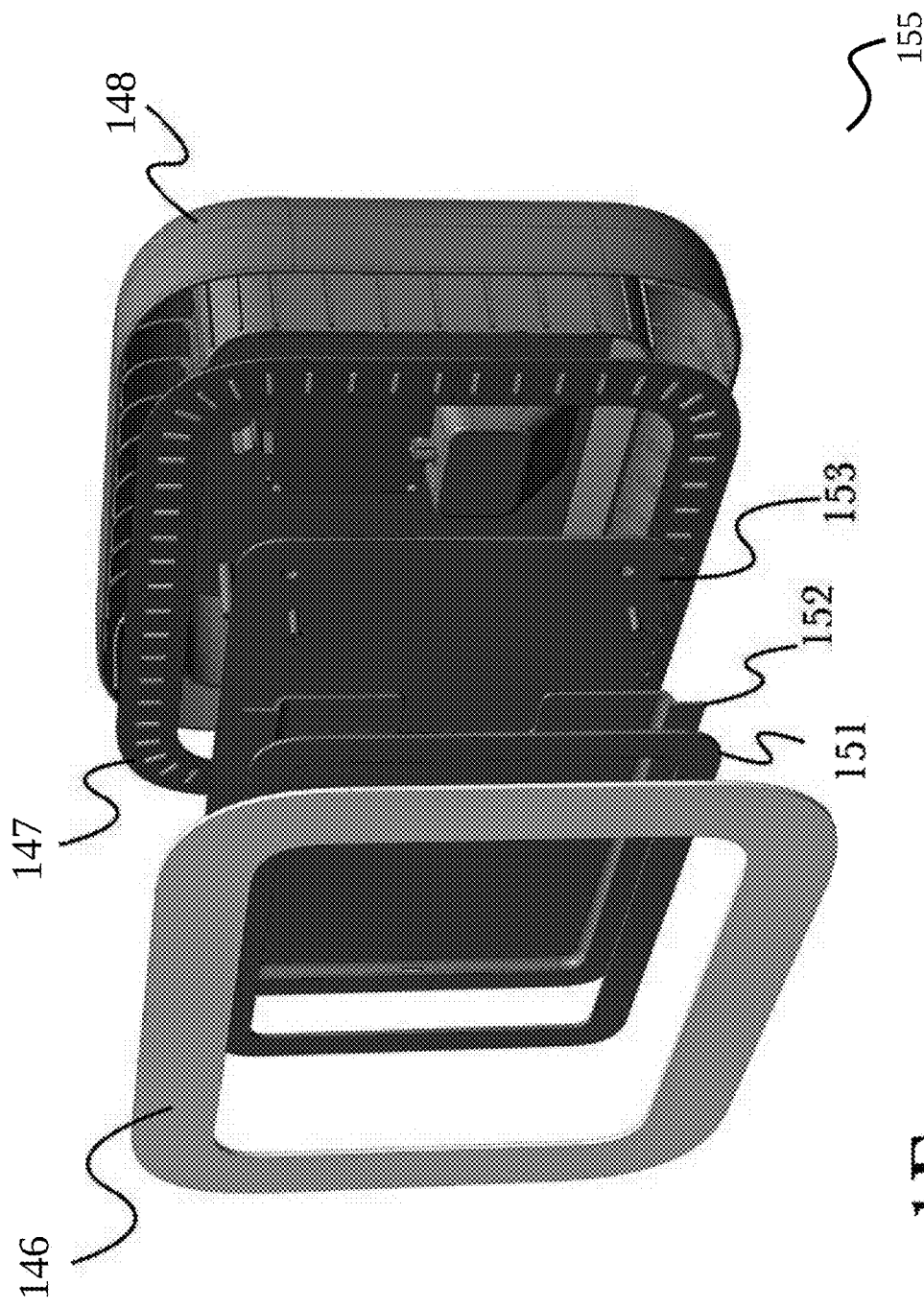
FIG. 1E is an illustration of an exemplary hardware configuration of an apparatus for evenly-scattered adaptable subject lighting for mobile device photography, illustrating construction using a hinged configuration.
Figure 1F:
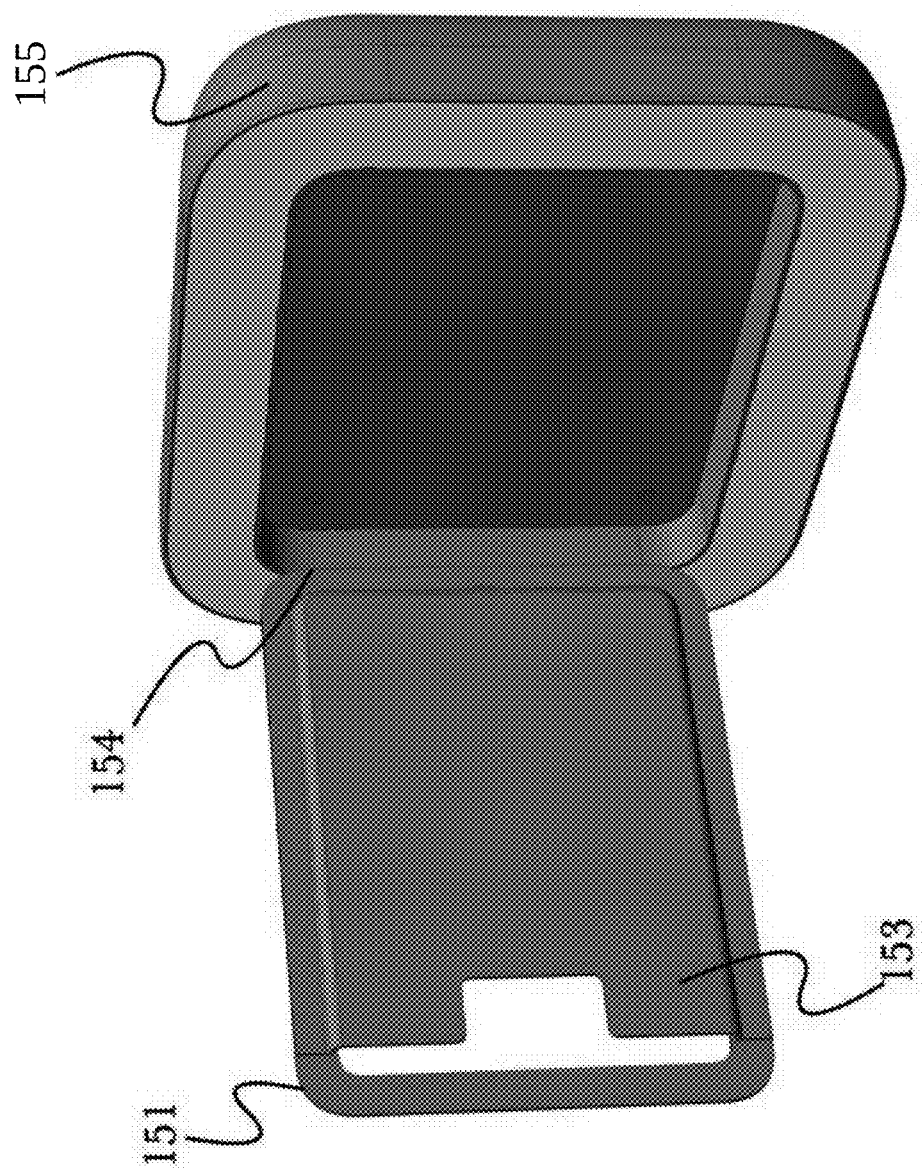
FIG. 1F is an illustration of an exemplary hardware configuration of an apparatus for evenly-scattered adaptable subject lighting for mobile device photography, illustrating the opening action of a hinged configuration.

FIG. 1E is an illustration of an exemplary hardware configuration of an apparatus for evenly-scattered adaptable subject lighting for mobile device photography, illustrating construction using a hinged configuration. In a hinged arrangement according to the embodiment, an enclosure 155 (as in FIG. 1F) may comprise a multi-piece (that is, at least, portions 146, 151, 152, 153, 147, and 148) clamshell-type design having a hinged assembly for securing a mobile device 114 (not shown in this illustration for clarity). An outer faceplate 151 may be used to secure the front of a mobile device 114, to, at least, protect the screen, prevent ingress of foreign matter into enclosure 131, prevent an extraction of the mobile device through a front opening, and the like. Faceplate 151 may be attached to a hinged tray 152 that encloses the body of a mobile device 114 to further secure and protect it, which may then be attached to a hinged backplate 153 that is secured within enclosure 155 during assembly. When assembled in this manner, enclosure 155 may be opened about a hinge 154 (as shown in FIG. 1F), to allow access to a secured mobile device 114 for installation, removal, or adjustment as necessary. As shown, illuminating portions 147 may comprise a formed portion within enclosure 155 constructed of a transparent or translucent material, to allow light from an illumination elements embedded into portion 147 (as described earlier) to shine through. Illumination portion 147 may comprise a plurality of lighting elements such as (for example) LEDs or electroluminescent (EL) wire or other materials, configured to emit light optionally in preset or configurable frequencies and intensities (for example, some arrangements may utilize programmable LEDs that can change color or brightness via a software application). By carrying the material properties of illuminating portion 147 such as thickness, color, or opacity, various lighting properties may be achieved for various use cases or to accommodate different photography conditions such as background colors or ambient lighting. In some embodiments, the shape (e.g. concave, flat, etc.) of front portion 146 determined the distribution of light from illuminating middle portion 147 which may include, but not limited to, illumination intensity, illumination direction, and the like.

FIG. 1F is an illustration of an exemplary hardware configuration of an apparatus for evenly-scattered adaptable subject lighting for mobile device photography, illustrating the opening action of a hinged configuration. According to the embodiment, an assembled hinged enclosure 155 may be opened about a hinged portion 154 to expose an assembled hinged assembly with a mobile device 114 (not shown) secured between a faceplate 151 and hinged back plate 153. This may be used, in some embodiments, to enable rapid and convenient insertion or removal of a mobile device 114 or adjustments to its position or configuration that may not be possible when fully secured within enclosure 131 with the hinged assemble closed. It may be further seen that this hinged assembly does not affect illuminating portions 132, so any configuration or adjustments may be retained when making adjustments to a mobile device 114.

In this manner, it may be appreciated that a wide variety of attachment and mounting options may be provided and compatibility may be facilitated with a variety of third-party hardware and devices, as well as providing for flexible attachment options for various purposes. For example, an apparatus for evenly-scattered adaptable subject lighting for mobile device photography may be mounted to a camera tripod for use in professional photography without using separate camera or lighting equipment, utilizing a mobile device that may already be available. In another exemplary use case, an apparatus for evenly-scattered adaptable subject lighting for mobile device photography may be setup for public use such as at an event (for example, a sporting event or a music concert), a restaurant or bar, or in a store such as for use by customers to photograph themselves with various items they are considering for purchase. By utilizing common mounting options and locking devices, it is possible to easily deploy mobile devices for rapid and familiar interaction by customers, patrons, or other individuals, to provide an improvement over systems known in the art to empower users to take professional-grade photographs without expensive or complex equipment and without special skill or any additional training or instruction.

FIG. 1G is an illustration of an exemplary hardware configuration of an apparatus for evenly-scattered adaptable subject lighting for mobile device photography, illustrating a removable cable connector housing in a closed configuration. According to the embodiment, case 160 comprises removable cable connector housing 161 to conceal, contain, and access a cable connector (for example, an Apple Lightning™ connector, a universal serial bus (USB) cable, an Apple™ 30-pin connector, a MagSafe™ connector, and the like) for powering device 114 by connecting to a power source, or communicating with device 114 from another device (not shown), or both. As illustrated, in a closed arrangement, a cable connector may reside within removable cable connector housing 161 and accessed by removing removable cable connector housing 161 as described below. In some embodiments, removable cable connector housing 161 is secured using a fastener (not shown) to limit access to the power connector (for example, whereby to access a cable connector, one may require a custom or specific tool). In a preferred embodiment, removable cable connector housing 161 is seated flush to case 160 whereby the bottom piece is molded consistent with contours of case 160.

FIG. 1H is an illustration of an exemplary hardware configuration of an apparatus for evenly-scattered adaptable subject lighting for mobile device photography, illustrating a removable cable connector housing in a partially open configuration. According to the embodiment, partially removed removable cable connector housing 162 is illustrated in a partially removed configuration. In a preferred embodiment, removable cable connector housing 162 slides horizontally away from device 114 to expose a cable connector. In some embodiments as removable cable connector housing 162 is slid horizontally away from device 114, the cable connector is drawn with removable cable connector housing 162 such that the cable connector is removed (i.e. disconnected) from device 114. In another embodiment, removable cable connector housing 162 is snapped into place whereby grooved members (not shown) allow for retention and removal of removable cable connector housing 162 within case 160.

Figure 1I:
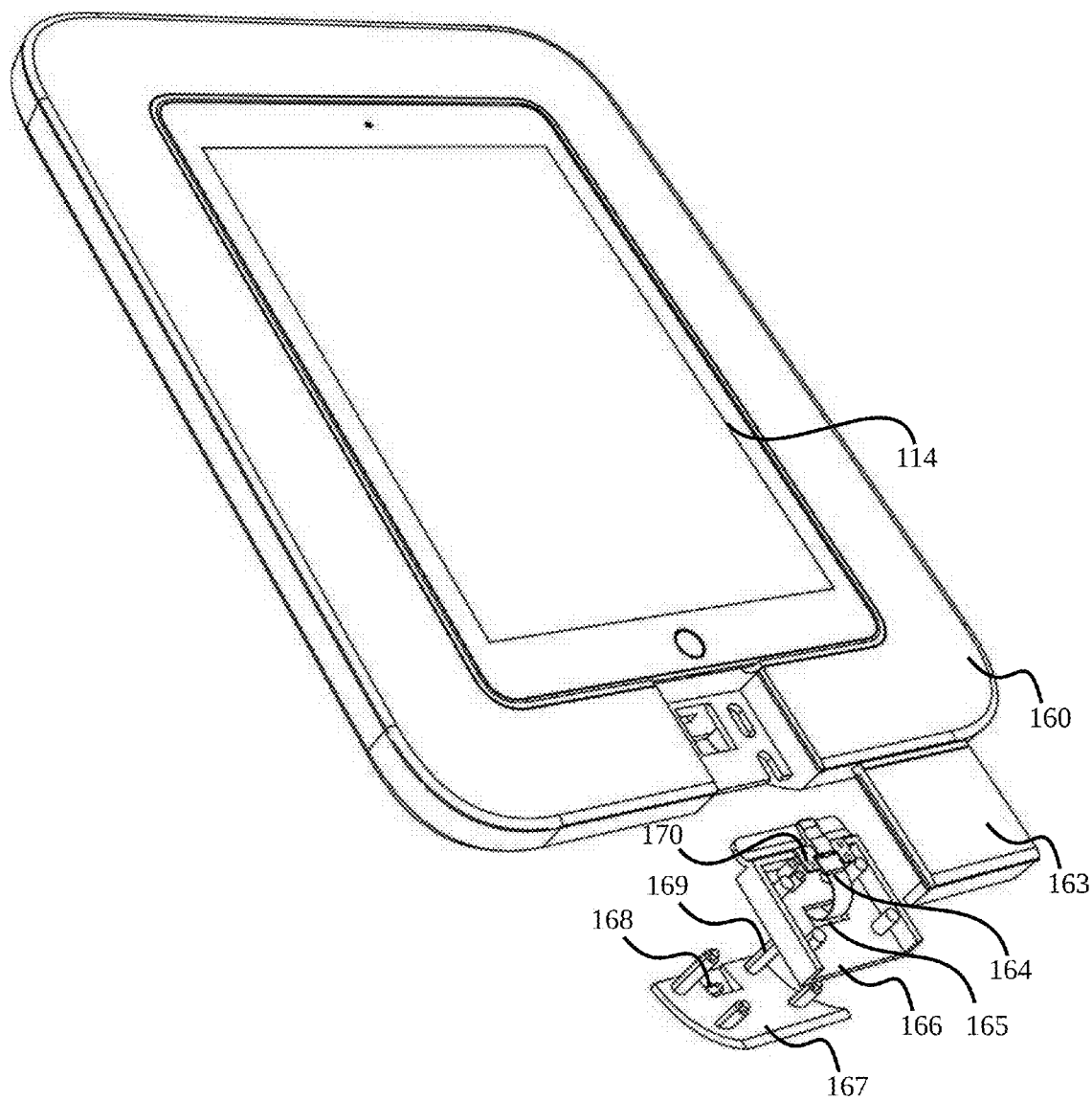
FIG. 1I is an illustration of an exemplary hardware configuration of an apparatus for evenly-scattered adaptable subject lighting for mobile device photography, illustrating a removable cable connector housing in an open configuration.

FIG. 1I is an illustration of an exemplary hardware configuration of an apparatus for evenly-scattered adaptable subject lighting for mobile device photography, illustrating a removable cable connector housing in an open configuration. According to the embodiment, removable cable connector housing 162 separates into top portion 163, middle portion 166, and bottom portion 167. Middle portion 166 comprises access hole 165 to accept cable connector 164 and cable mounting portion 170. Cable mounting portion 170 accommodates a mounting of cable connector 164 via one or more fasteners (for example, hook and loop, screws, rivets and the like) to allow an attachment of cable connector 114 to middle portion 166 such that, when mounted, cable connector 164 is placed in harmony and acceptable by a corresponding female connecting slot of device 114 by, for example, using a horizontal sliding motion of removable cable connector housing 162 (when assembled). It should be appreciated that, in a preferred embodiment, by attaching cable connector 164 to middle portion 166, an operator would be able to easily engage and disengage cable connector 164 with device 114 by manipulating removable cable connector housing 162 without handling cable connector 164 directly. Bottom portion 167 is a contoured portion matching the contours of case 160 such that when assembled, removable cable connector housing 162 sits flush with case 160. A plurality of mounting members 169 allow for the assemblage of bottom portion 167, middle portion 166, and top portion 163 (into removable cable connector housing 162) using fasteners. Bottom portion 167 further comprises access hole 168 to accept cable connector 164.

In some embodiments, bottom portion 167 fastens to middle portion 166 and to case 160 and becomes part of case 160. In this regard, only top portion 163 is removable to expose cable connector 164 for access and manipulation by an operator while bottom portion 167 and middle portion 166 remain fastened to case 160.

Figure 2:
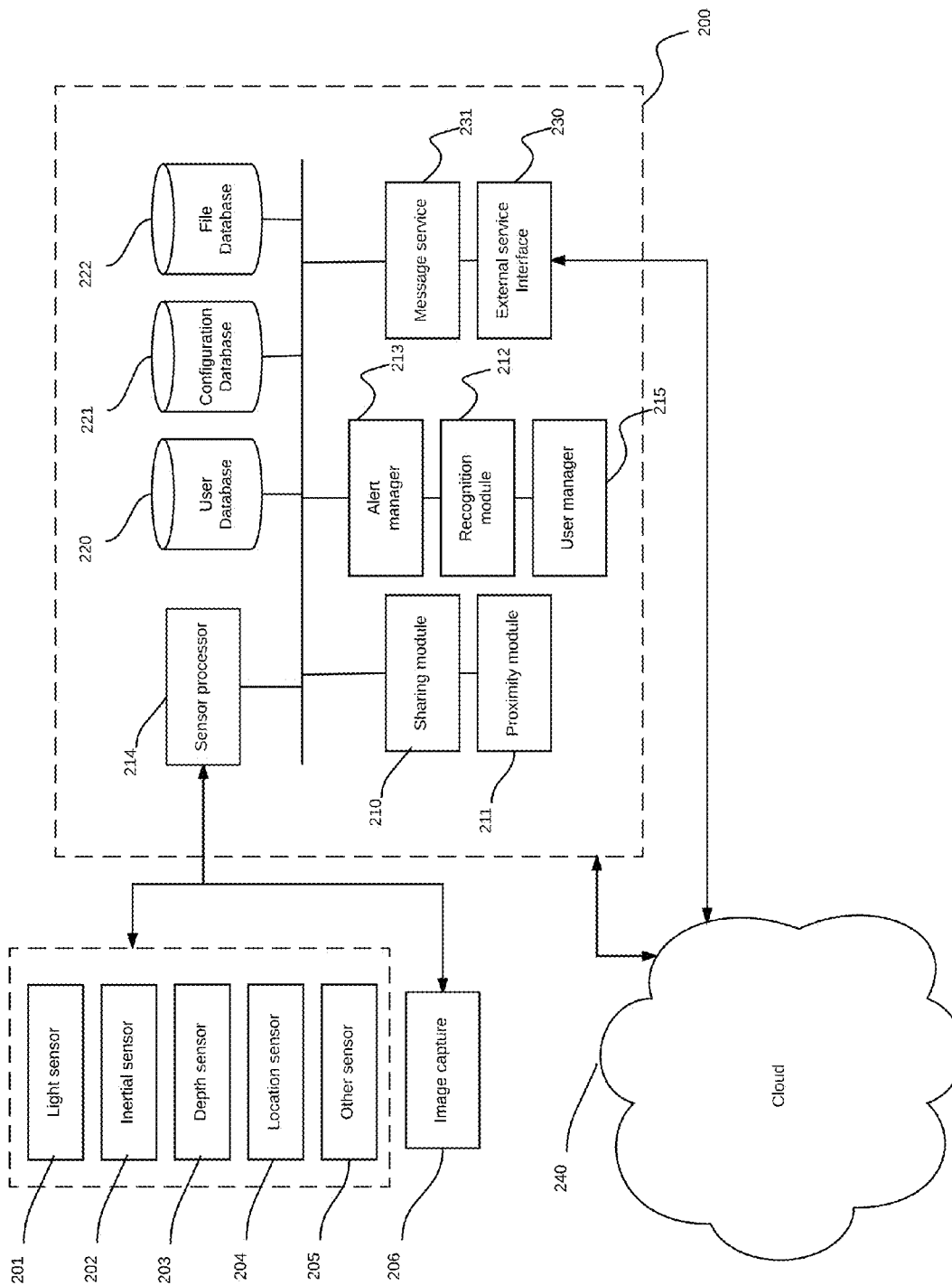
FIG. 2 is an illustration of an exemplary architecture of sensor processing systems, according to a preferred embodiment of the invention.

FIG. 2 is an exemplary architecture diagram for a sensor processing system, according to a preferred embodiment of the invention. According to the embodiment, the sensor processing system 200 comprises at least a plurality of programming instructions stored in a memory 25 and operating on one or more processors 21 of a specially programmed computing device 114, and configured to direct the operation of the illuminating portion (for example, circular illuminating portion 132 or illuminating board 132*a* of device 114, or other illumination unit internal or external to device 114, or any combination thereof) for evenly-scattered adaptable subject lighting for: mobile image capture; share images or files (or both) across network 240 for example networks 31), interface with one or more other sensor processing systems 200, connect to external services via external services interface 230, or the like. According to the embodiment, a light sensor 201 may comprise a plurality of electronic devices to detect light such as photo-voltaics, photo-emissives, and the like, or photo-resistors, photo-conductors, and the like (or a combination of one or more) to generate a signal to sensor processor 214 indicating the intensity of light by measuring the radiant energy that exists in a range of frequencies for example, ranging in frequency from "Infra-red" to "Visible" up to "Ultraviolet" light spectrum. In this regard, sensor processor 214 may direct other processes to behave based on the generated signal, for example, to manipulate an output range for circular illuminating portion 132, illuminating board 132*a*, or other illumination unit for optimum subject illumination. Inertial sensor 202 may comprise an accelerometer, a gyroscope, or a magnetometer (or any combination thereof) to act as an inertial measurement unit to detect motion or orientation of sensor processing system 200. In this regard, sensor processor may alter behavior for specific functions based on device movement or orientation (such as rotation or position), As such, various system reactions may be initiated such as, a change dimensions of an image from image capture 206, send messages via message service 231 to one or more external services 230 (for example, sensor processing system 200 has experienced a sudden impact). Depth sensor 203 may comprise an infra-red projector an infra-red camera, a Red-Green-Blue (RGB) camera, or another depth sensor element. Accordingly, depth sensor 203 may sense background depth detection based on information received by image capture 206 or in some embodiment, a depth may be preconfigured and read from configurations from configuration database 221. In other embodiments a combination of both may be used. Location sensor 204 may comprise a GPS receiver, an optical position sensor, altimeter, and the like. Accordingly, location and position information may be sent to sensor processor 214 based on certain events such as: image capture 206 is triggered; recognition module recognizes some action, person, or situation; sharing module 210 shares a file or image; a particular user enters the system vis user manager 215; from some received communication from external service 230, for example, a request to transmit a video feed from image capture 206. In a preferred embodiment, other sensor 205 may be a battery level sensor that monitors battery levels for both device 114 or power supply unit 45 (see FIG. 10) within case 160. In some embodiments other sensor 205 may be a storage/memory monitor to measure available storage or memory of device 114. In some embodiment, other sensor 205 may be a data transfer monitor sensor to measure network up/down data rates. In other embodiments, other sensor 205 may measure humidity, temperature, voice (e.g. a microphone), an Internet-of-things (IoT) device, or any other sensor whose purpose is to detect events or changes in its environment, and then provide a corresponding output to sensor processor 214. In some embodiments, preconfigured thresholds and alerts may be set based on measurements of other sensor 205. Image capture 206 may be a camera, a video capture device, a scanner, a barcode reader, an infrared detector, a retinal scanning device, and the like.

Sensor processor 214 receives signals and messages from sensors 201-206 and may trigger events based on specific input. Sharing module 210 enables sharing of images, videos, files, metadata, and other information within sensor processing system 200. In some embodiments, sharing module may prompt a user through a display (for example, input devices 28), or use user information from user manager 215 to connect to, for example, a social network via external services interface 230. Recognition module 212 may be a pattern recognition system such as a facial recognition system comprising programming instructions capable of identifying or verifying a person from an image or a video frame from image capture 206 by comparing selected facial features from the image and a facial database stored in user database 220. In some embodiments, recognition module 212 may recognize other patterns such as objects, shapes, and the like. In other embodiments recognition module may perform automatic speech recognition (ASR) comprising programming instructions to implement methodologies and technologies that enables the recognition and translation of spoken language into text. In this regard, recognized text may be attached as metadata to files, images, comprise the body of a message or post, or any combination thereof. Proximity module 211 may identify a proximity of other sensor processing systems 200 that may fit some predefined criteria. For example, based on a social matrix received from a social network via external services interface 230, common connections may be made aware when friends are currently operating another sensor processing system 200 and establish a communication via message service 231. In this regard, images, video, audio, or other sensor data may be shared to a plurality of sensor processing systems 200. User manager 215 may manage a plurality of users based on information entered through input devices 28 (for example, user information entered through a touch-screen device), from information received from external services interface 230 (for example, a social matrix from a social networking service), or form some other source. In some embodiments, user information is stored in user database 220. Message service 231 may be a plurality of program code configured to implement a plurality of messaging services such as multimedia content to and from mobile devices over network 240 and may comprise messages such as a picture message, a multimedia message, SMS (Short Message Service), audio, email, or leverage well known messaging services known in the art such as SIP communication, Skype™, Facebook Messenger™, Snapchat™, or post images or messages to services such as Tinder™, Facebook™, LinkedIn™, and the like. In some embodiments, message service 231 may deliver a variety of media, including, a slideshow of multiple images, or audio. External services interface 230 may connect to a plurality of external services such as social networking platforms, dating platforms, stock tracking platforms, other sensor processing systems 200 and establishes communication to these services. User database 220 may hold user information and be populated by manual input via input devices 28, or be configured from user information (for example a social matrix) received from external services 230. Configuration database may be managed by an administrator to, for example, set the system operating parameters such as set thresholds, flag users, and identify other system parameters. File database 222 may store images, video, recognized information from recognition module 212, messages from message service 231, and the like and may be used by various components of sensor processing system 200. Alert manager 213 maintains a plurality of preconfigured thresholds and alerts whereby a plurality of associated actions can be performed based on one or more events within sensor processing systems 200, for example, events based on sensor input at sensor processor 214 such as a temperature threshold, internal sensor change, changes in lighting, change in location, and the like. Similarly, alert manager 213 may be triggered by a combination of events such an image from image capture 206 is recognized via recognition module 212 as an actionable event and a message is sent (for example, an image of a person of interest and metadata comprising at least location is sent to law enforcement, or a pre-configuration to post images of a certain individual that appears at a sensor processing system 200 automatically posts to a social media newsfeed when recognized by recognition module 212); a particular user has arrived at sensor processing system 200 whereby a connection (as identified by proximity module 211) is at another sensor processing system 200, and a communication (for example, an image exchange, audio conversation, video conversation, etc.) is automatically initiated via message service 231.

In a preferred embodiment, sensor information from sensor processor 214, recognition module 212, proximity module 211, and sharing module 210 may be configured as metadata and be attached to a file or image (or both), be stored in user database 220, be stored in file database 222 (for example, associated to an image that was taken by image capture 206. In other embodiments, sensor information received may be captured and attached to an image, file, or database based on preconfigured conditions or thresholds, for example, recognition module 212 identifies a particular user from an image captured by image capture 206 corresponding to a flagged user profile in user database 220. In this regard, sensor manager may attach sensor information, associate it to the captured image and store a record in user database 220. In some embodiments further actions may be triggered, for example, message service 231 may automatically interface to external service 230 and send a message comprising the image and metadata to an external service such as a social network, law enforcement, another sensor processing system 200, or the like.

Figure 3:
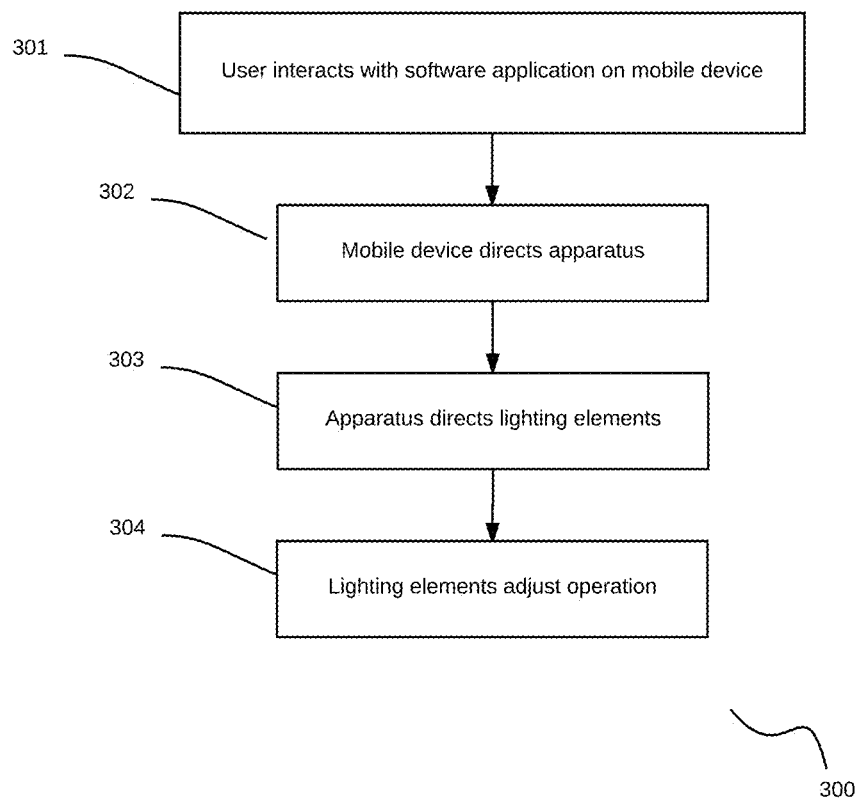
FIG. 3 is a flow diagram of an exemplary manual method for adjusting subject lighting using programmable instructions on a mobile device, according to a preferred embodiment of the invention.

FIG. 3 is a flow diagram of an exemplary manual method 300 for adjusting subject lighting using programmable instructions on a mobile device, according to a preferred embodiment of the invention. In an initial step 301, a user may interact with mobile device 114 for example, including but not limited to, a tablet computing device, a specially programmed computing device, or the like, to, for example, provide input regarding photography preferences such as lighting, focus, or filters that a user may wish to have applied to a photograph. Mobile device 114 may then direct, in step 302, the operation of an apparatus for evenly-scattered adaptable subject lighting for mobile device photography based at least in part on the user input, and in a next step 303, the apparatus may direct a plurality of lighting elements, for example, an illuminating portion 112. In a final step 304, some or all lighting elements may adjust their operation based at least in part on the user's input from a previous step 301. In this manner, a user may manually configure general or specific lighting properties they wish to use for their photograph, such as specifying photography filters to apply, specific lighting intensity or color, or (for example, in some software arrangements) to interact directly with a "preview" image to achieve the user's desired effects, and mobile device 114 may direct the operation of apparatus 100 to achieve the intended result. In some embodiments, device 114 allows a user to choose graphic stickers, overlays, decorations, or the like to be placed on an image stored on device 114 or captured via image capture 206. In this regard, a user may adjust the crop of an image via device 114. In some embodiment, a smart crop feature may auto crop images whereby recognition module 212 detects, for example, faces from a stored image or an image captured via image capture 206 whereby an automatic crop function may position faces in a centered position of the frame for pleasing aesthetics.

Figure 4:
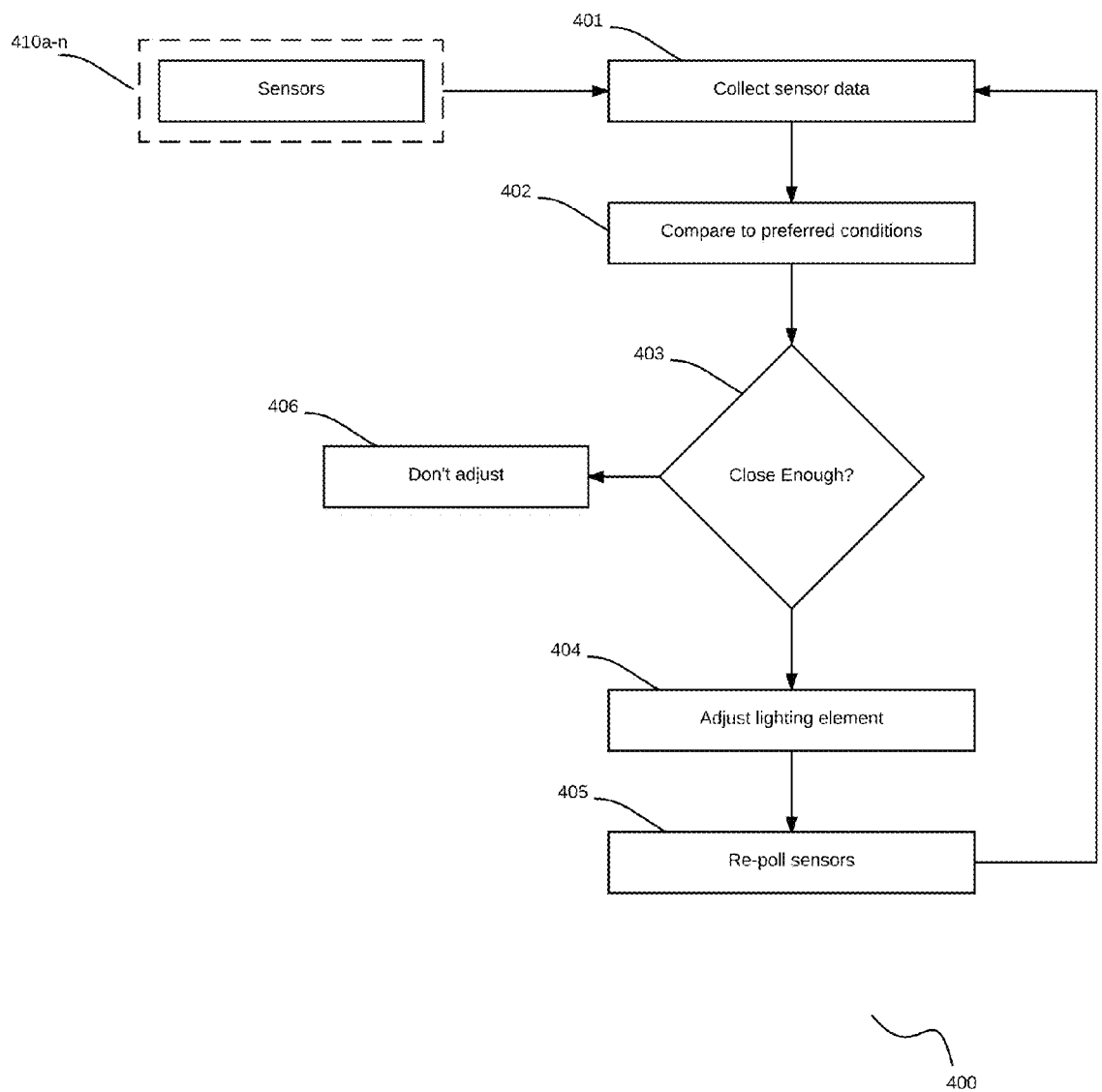
FIG. 4 is a flow diagram of an exemplary adaptive method for automatically adjusting subject lighting, according to a preferred embodiment of the invention.

FIG. 4 is a flow diagram of an exemplary adaptive method 400 for automatically adjusting subject lighting using hardware sensors, according to a preferred embodiment of the invention. In an initial step 401, a plurality of hardware sensors 410a-n may provide data for collection, for example, ambient conditions, rotation or position, or background depth detection. Sensor information may be compared in step 402 to predetermined preferred values, for example preset values corresponding to specific photography conditions such as outdoor lighting, close-up photography, or other settings. If the apparatus determines that the detected values are acceptable in step 403, then light elements (such as an illuminating case portion 112, described above in FIG. 1A) may not be adjusted. If the detected values are determined in step 403 to be unacceptable, lighting elements may be directed in step 404 to adjust their operation in response to measured sensor values. For example, if ambient light conditions are detected to be bright or to have a particular color cast, an illuminating portion 112 may be directed to lower in intensity or to alter its hue. In a final step 405, sensors may be re-polled for new data after adjusting lighting elements, and operation may continue in a continuous looping fashion to continually update the operation of lighting elements in response to sensor measurements. In this manner, an apparatus for evenly-scattered adaptable subject lighting for mobile device photography may direct its own operation based on measured environmental and subject factors, to provide ideal lighting for any photography conditions with minimal effort or configuration.

Figure 5:
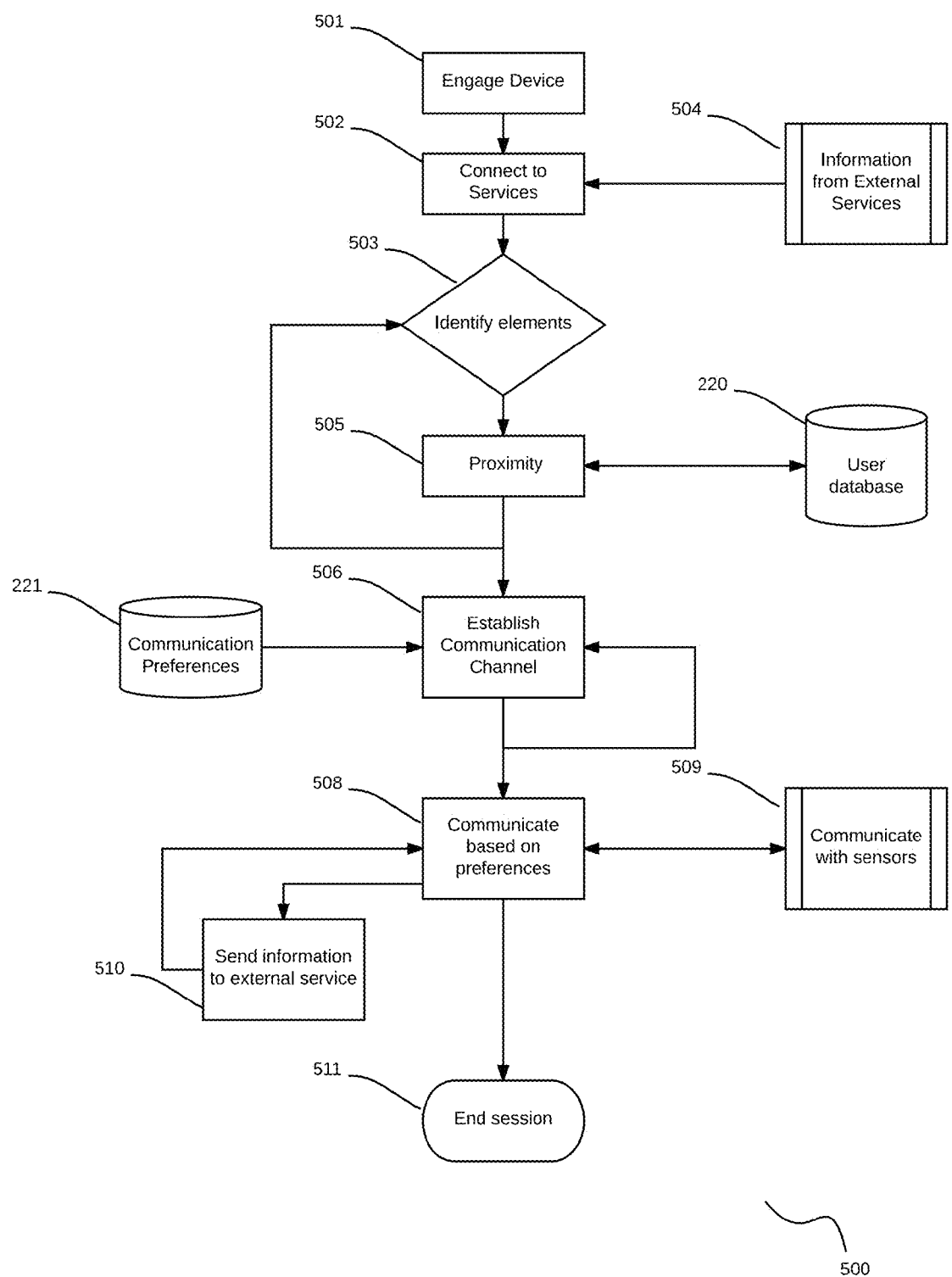
FIG. 5 is a flow diagram of an exemplary communication arrangement between a plurality of sensor processing systems, according to a preferred embodiment of the invention.

FIG. 5 is a flow diagram of an exemplary communication arrangement between a plurality of sensor processing systems, according to a preferred embodiment of the invention. According to the embodiment, in a first step 501, sensor processing system 200 is engaged by a user, for example, via a touchscreen interface 47. A user may be identified through input of user identification information, facial or audio recognition, or though some other identification mechanism. In some embodiments, a user may be authorized via, for example, a pre-configured user profile on user database 220. In other embodiments, a user may be authorized though partner login services known in the art. In other embodiments, a user may be authorized by accessing an associated platform, for example a social network, LDAP, or some other network service accessed via cloud 240. In a next step 502, sensor processing system 200 may access external services associated to the user, for example, preference information, social connections, account balances, or other information by optionally accessing one or more external services 504 via external service interface 230. In this regard, sensor processing system 200 may determine, for example, the user's connections such as Facebook™ friends, LinkedIn™ colleagues, Tinder™ preferences, Snapchat™ connections & stories, and the like. In a next step 503, elements collected from external services are iteratively classified and categorized. In this regard, conversations may be analyzed to discover information about connections, for example, a conversation may identify that a plurality of users may have been planning to meet up. In other embodiments, step 503 may rank connections and identify which users to use in step 505 to determine proximity. For example, according to step 505, a proximity of connections associated to the user may be discovered and flagged to determine who may be currently connected to other sensor processing systems 200, or use location-based services (for example, four Square™, find my Friends™, etc.) associated to the user and the user's connections. In some embodiments, a user matrix may be determined by connections to external services through external services interface 230 or by connections associated to the user via user database 220. in a next step 506, upon a connection being discovered that is in proximity (it should be appreciated that "in proximity" refers to a state where a connection is contactable by being connectable to sensor processing system 200 rather than physical proximity, for example connected to another sensor processing system 200 in a foreign country), a communication opportunity may be offered to the user. For example, the user may be notified that a connection is currently connected to another sensor processing system 200. In this regard, based on communications preferences stored in configuration database 221, may be pre-configured to, for example, auto share images as captured by sensor processor 214 from image capture 206. In this regard, metadata may be included in a communication between the user and the connection. In some embodiments, message service may automatically send images or video as captured by image capture 206. In other embodiments, a request is made to the user to initiate a communication. In other embodiments, communication preferences 221 may be configured to auto-share sensor information (for example, from image capture 206) to be placed on, for example, a timeline feed of a connected social network via external service interface 230 (for example, Snapchat™). In other embodiments, in step 508, a communication established in step 506 may initiate an email to be sent to a user configurable destination or a pre-configured destination. Once communication preferences are read and processed by message service 231, a communication is sent in step 510 to one or more external services connected vis external service interface 230. In some embodiments a user may be prompted, or an automatic reading of one or more sensors 201-106 may be included in a communication. For example, an image, location, temperature, humidity, inertial information, and the like. In a final step 511, a session with sensor processing system 200 may be ended by the user.

In some embodiments, flow 500 may commence when a process with a continuous image feed is executing on sensor processing system 200, in this regard, periodically, an image is sent to recognition module 212. If a recognized image is detected (for example, by comparing the image to a pre-defined image-of-interest in user database 220), a communication event can be initiated by alert manager 213. For example, the image may be of a known criminal and the image and sensor information (for example, location information) may be sent to law enforcement by message service 231.

Figure 6:
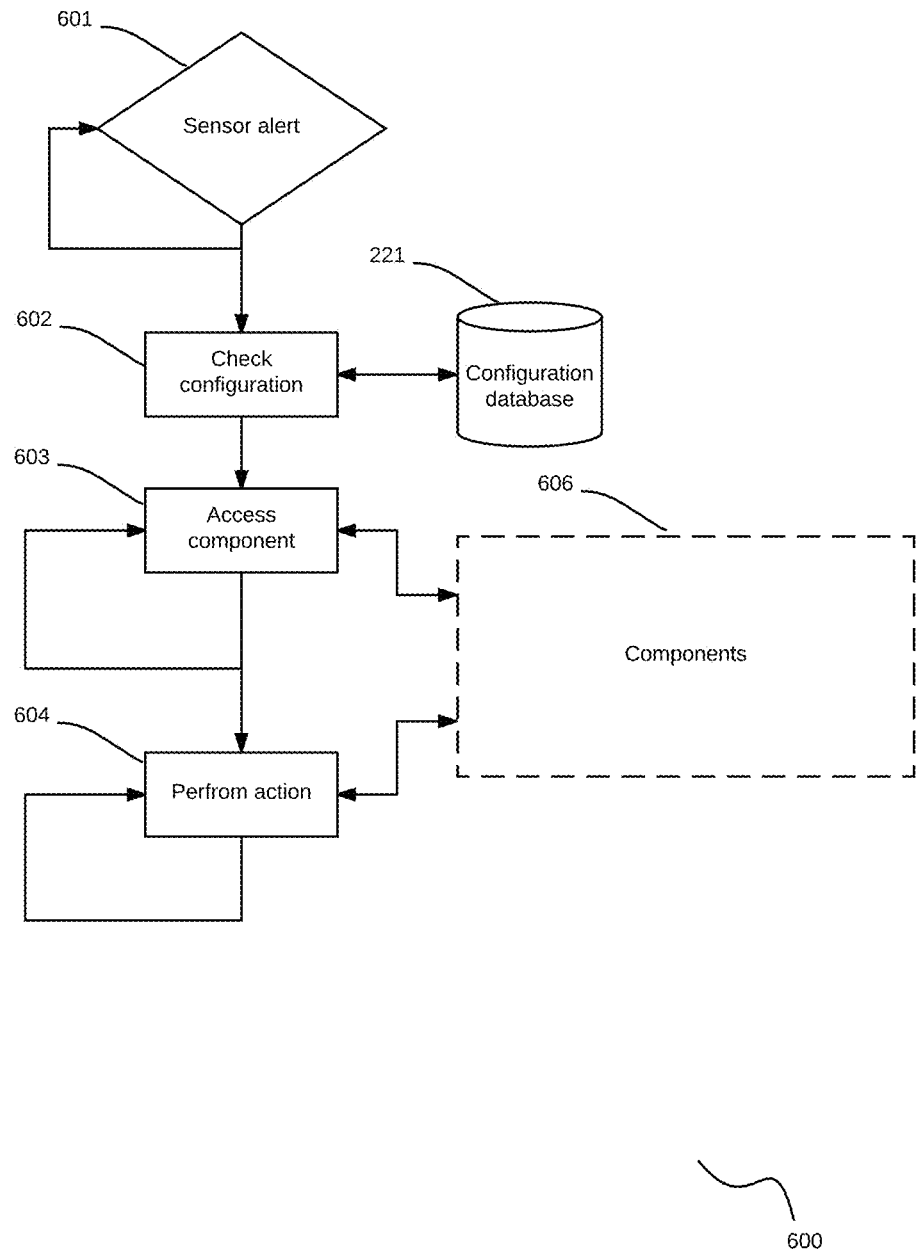
FIG. 6 is a flow diagram of an exemplary sensor trigger, according to a preferred embodiment of the invention.

FIG. 6 is a flow diagram of an exemplary sensor trigger, according to a preferred embodiment of the invention. According to the embodiment, at a first step 601, a process within sensor processing system 200 runs and waits for an event from one or more sensors, for example, information from an IoT device such as the operation of a door or a window, an image has been captured, a certain threshold has been reached within the environment, etc. In step 602, configuration associated to the event is compared to known thresholds and alerts as stored in configuration database 221. In this regard, configuration database 221 may outline a plurality of rules based on the alert, for example, to interface to one or more IoT devices to effect change on to which they may control (for example, temperature or other environmental controls, monitoring systems, communications systems, mechanical systems such as to open doors, windows, or gates, and the like). In a net step 603, according to, for example, the rules outlined in configuration database 221 associated to the alert, sensor processing system 200 may access one or more components in step 606 to activate the execution of one or more rules from configuration database 221 in step 604. For example, recognition module 221 may be used to identify a subject or situation from an image captured from image capture 206, message service 231 may be engaged to send sensor information to external services connected via external service interface 230, sharing module may share images on one or more connected services connected through external service interface 230 (for example, a social network, or dating site). In some embodiments external services interface 230 may connect directly or indirectly to a printing device via output devices 27 such as a laser printer, inkjet, thermal, or some other printing device, or indirectly to a printing service such as Google Print™, Apple AirPrint™ Staples™ Print and Copy Center™, Kinkos™ printing service, and the like via network 240. A proximity module 211 may inform connections of a location to other users of other sensor processing systems 200.

Computing Hardware Architecture

Generally, the techniques disclosed herein may be implemented on hardware or a combination of programming instruction and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 7:
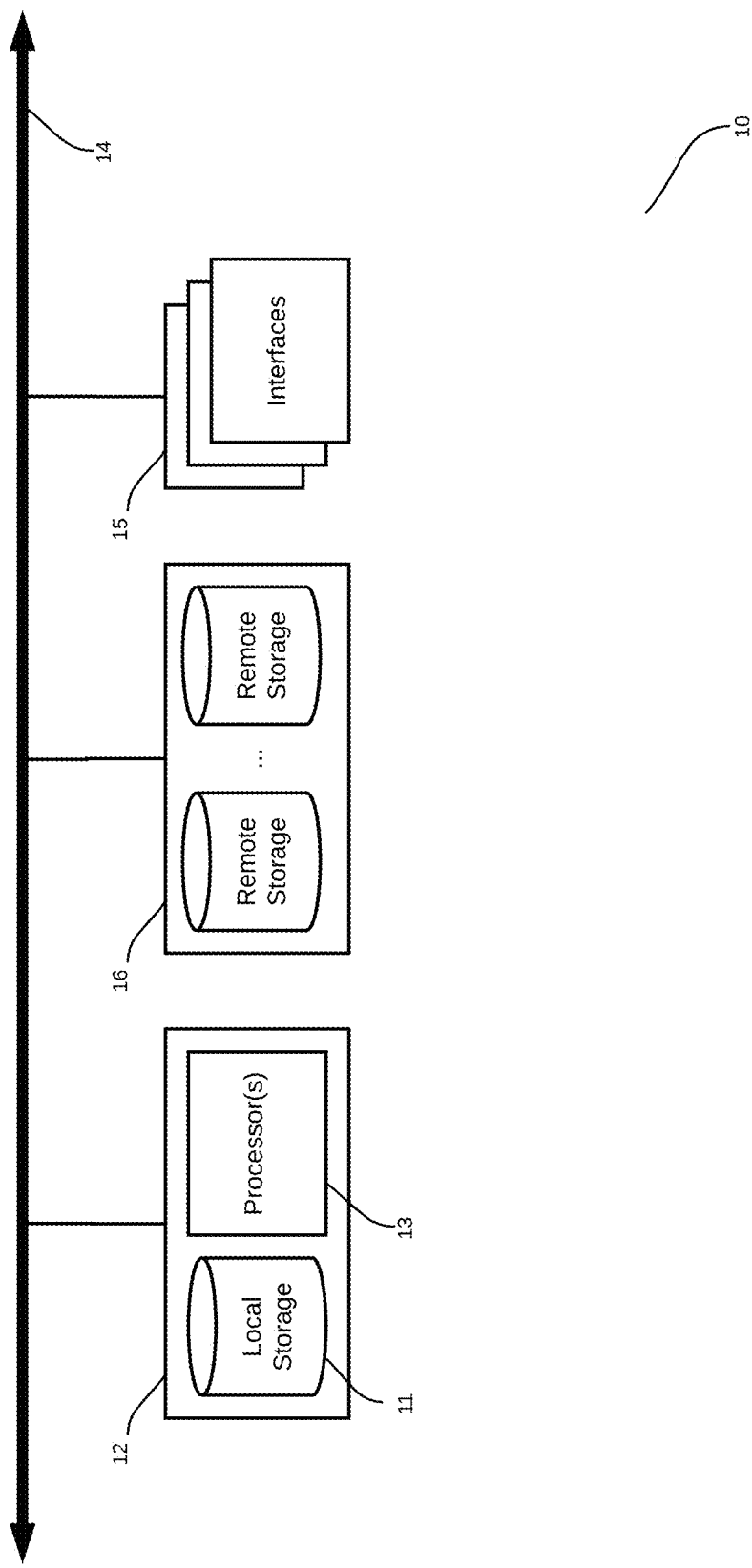
FIG. 7 is a block diagram illustrating an exemplary hardware architecture of a computing device used in an embodiment of the invention.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network;

other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 7 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions may include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, Objective C, Swift, or any other scripting language).

Figure 8:
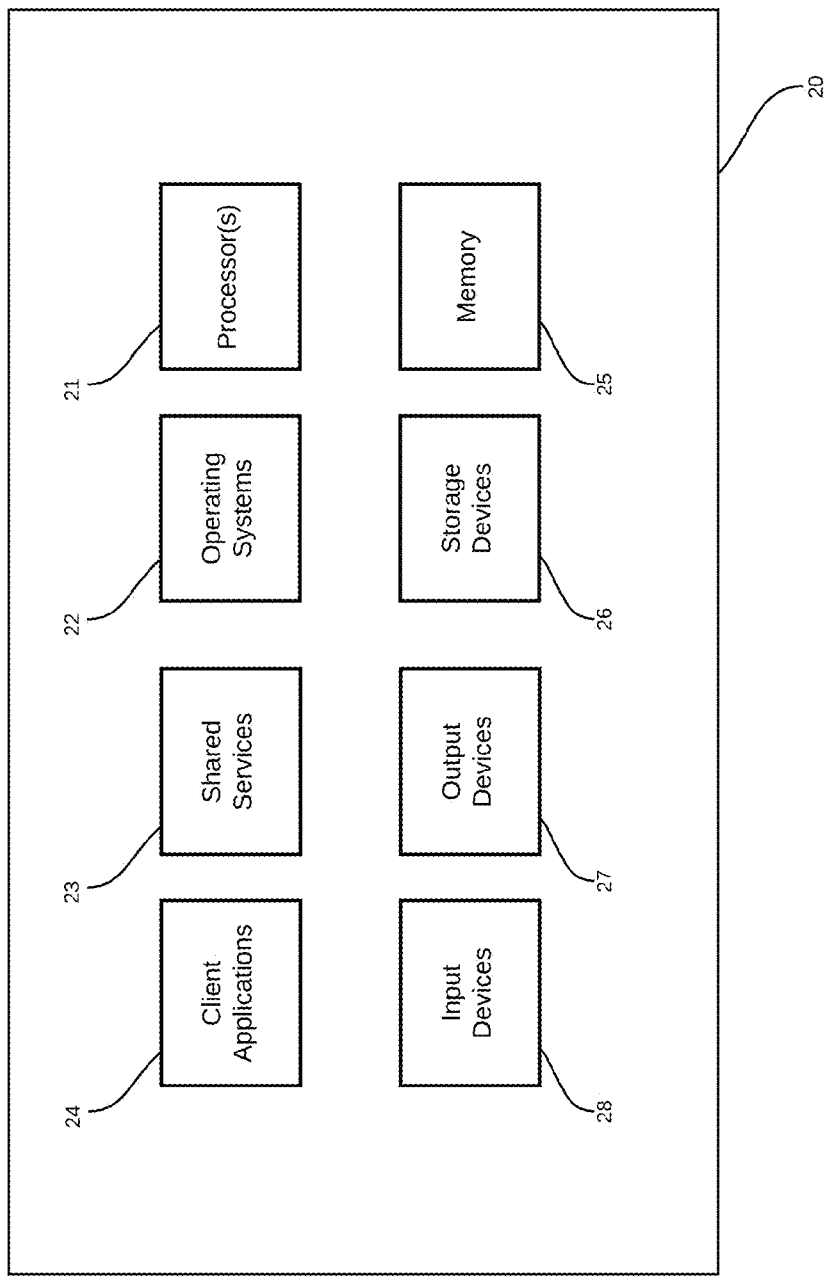
FIG. 8 is a block diagram illustrating an exemplary logical architecture for a client device, according to an embodiment of the invention.

In some embodiments, systems according to the present invention may be implemented on a standalone computing system. Referring now to FIG. 8, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS X™ or iOS™ operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 9:
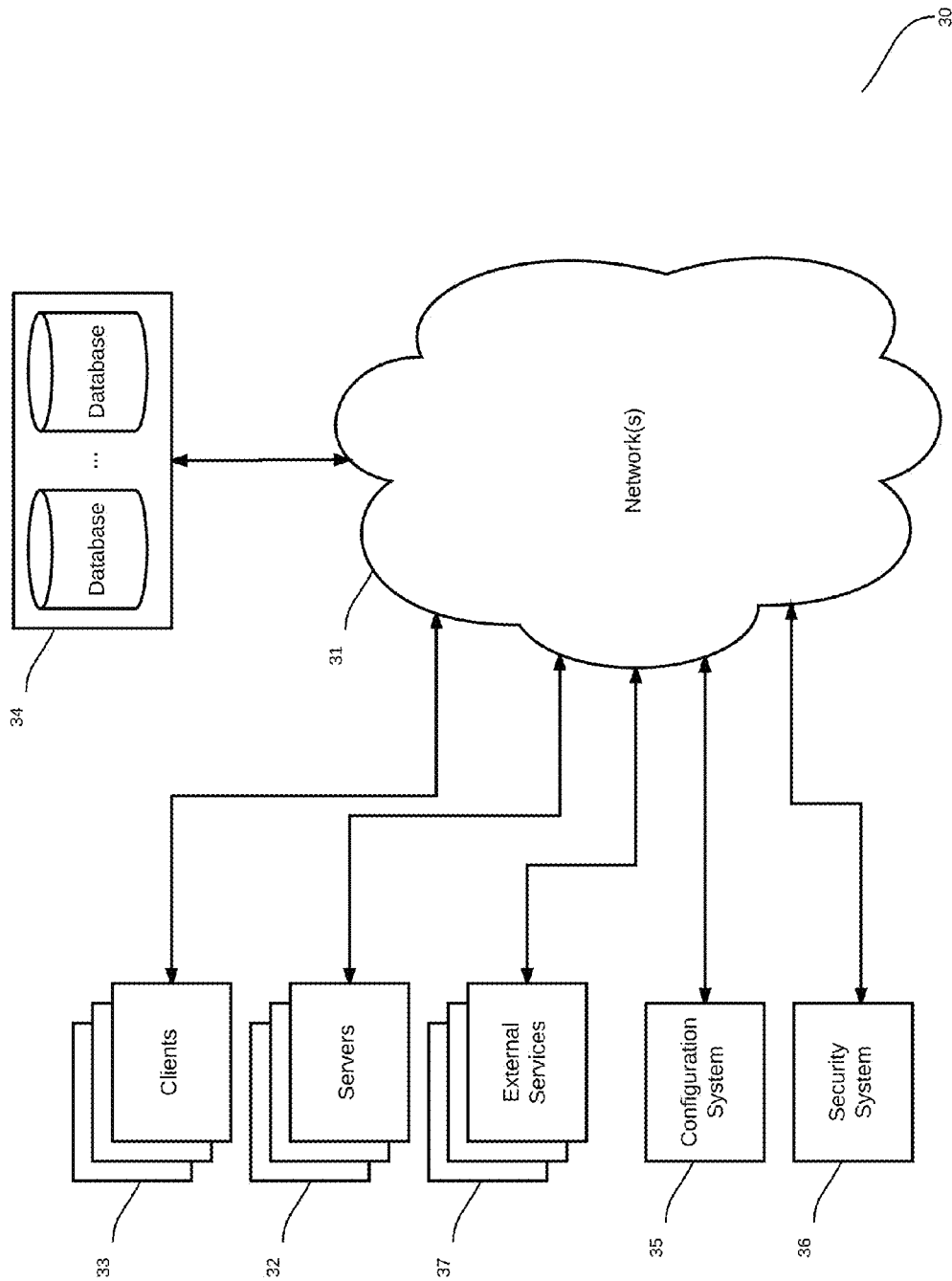
FIG. 9 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 9, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 10:
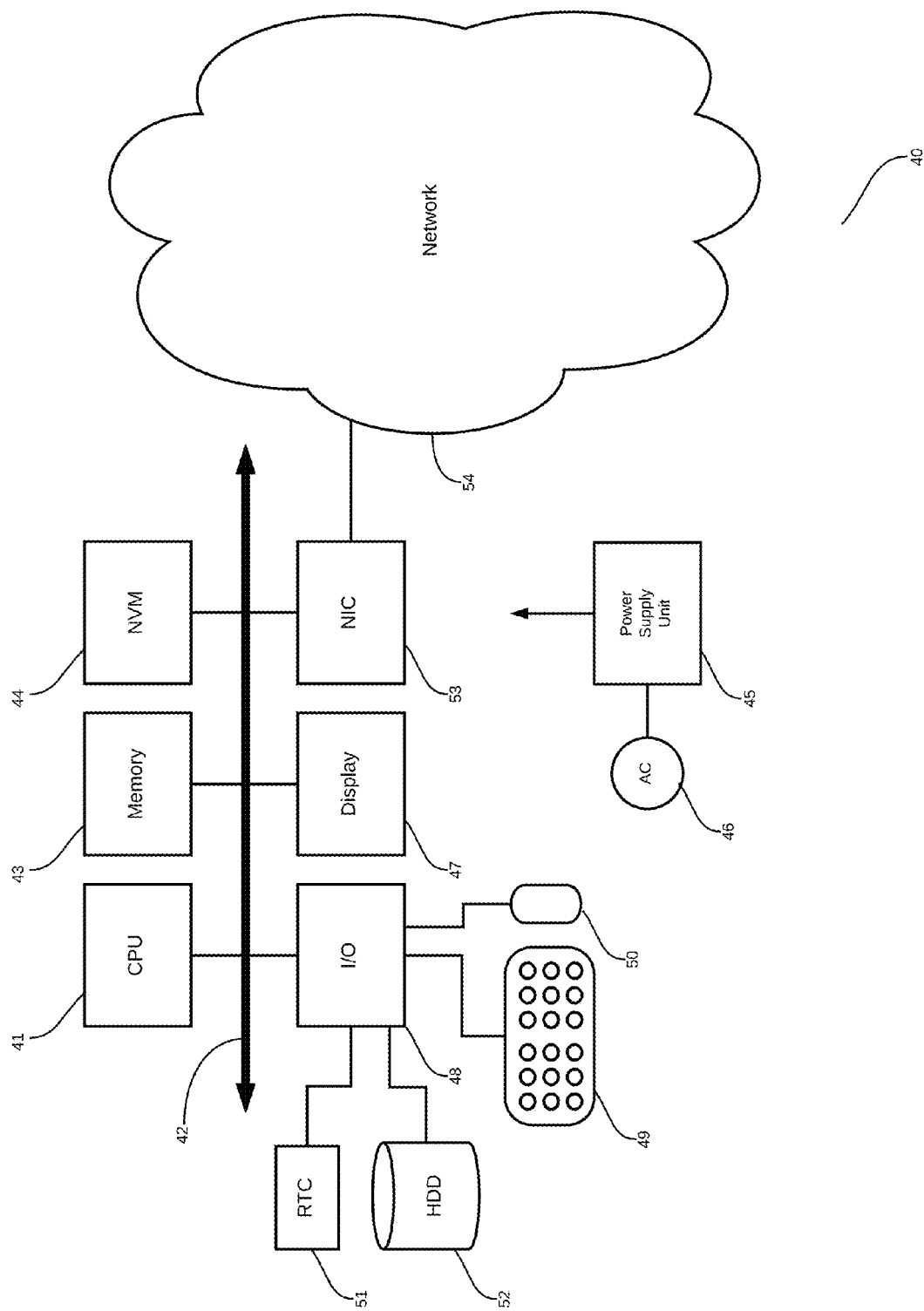
FIG. 10 is another block diagram illustrating an exemplary hardware architecture of a computing device used in various embodiments of the invention.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. In some embodiments, power supply unit 45 may be one or more batteries such lithium-ion (Li-on), Nickel Cadmium (NiCad), Alkaline or other rechargeable or non-rechargeable battery (not connected to supply 46). In some embodiments, power supply unit 45 may be placed within case 160 and connected to cable connector 164 to supply power (for example, as a primary or backup power source) to device 114. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. An illuminating apparatus for mobile device photography, comprising:
    a mounting apparatus for a mobile computing device, the mounting apparatus comprising at least:
        a front shell comprising a rigid material formed or machined to comprise at least an outer surface, an inner concave open region, an open window portion, and a toroidal illuminating ring;

a rear shell comprising a rigid material formed or machined to comprise at least an outer surface and an inner concave open region;

wherein the open window portion comprises at least an open region formed or machined as a portion of the front shell, configured to pass through the outer surface of the front shell and into the inner concave open region of the front shell;

wherein the illuminating ring comprises at least a rigid component encircling at least a portion of the circumference of the front shell parallel to the plane of the front shell and affixed or integrally-formed as a portion of the outer surface of the front shell at a plurality of points, and is configured to at least emit a controlled intensity of visible light, further wherein the illuminating ring is electrically coupled to the rear shell;

wherein the front shell and the rear shell are configured to be releasably coupled to each other; and wherein the inner concave open regions of the front and rear shells are configured to at least partially enclose the illuminating ring and the mobile computing device when so coupled.

2. The apparatus of claim 1, wherein the toroidal illuminating ring fully encircles the circumference of the front shell.

3. The apparatus of claim 1, wherein the illuminating ring is a semi-toroidal shape.

4. The apparatus of claim 1, wherein the illuminating ring emits at least a controlled intensity of visible light in all directions.

5. The apparatus of claim 1, wherein the illuminating ring emits at least a controlled intensity of visible light only in a direction perpendicular to the plane of the ring and the front shell.

6. The apparatus of claim 1, wherein at least the rear shell further comprises a plurality of hardware mounting fixtures.

7. The apparatus of claim 6, wherein the plurality of hardware mounting fixtures comprises at least a VESA-compliant mounting plate.

8. The apparatus of claim 6, wherein the plurality of hardware mounting fixtures comprises at least a plurality of threaded mounting sockets, wherein each socket is configured to accept a threaded bolt.

9. The apparatus of claim 8, wherein at least a threaded mounting socket is configured to accept a threaded mounting bolt of a photography tripod.

10. The apparatus of claim 8, wherein at least a portion of the plurality of threaded mounting sockets are configured to be coupled to a VESA-compliant surface mount.

11. The apparatus of claim 1, further comprising a plurality of hardware sensors, and wherein a controlled light emission of the illuminating portion is controlled at least in part by at least a portion of the plurality of hardware sensors.

12. The apparatus of claim 11, wherein the plurality of hardware sensors comprises at least a touch sensor.

13. The apparatus of claim 12, wherein the touch sensor comprises a touchscreen.

14. The apparatus of claim 12, wherein the window portion is configured to enable user interaction with a mobile device is enclosed by coupled front and rear shells.

15. The apparatus of claim 11, wherein the plurality of hardware sensors comprises at least a light sensor.

16. The apparatus of claim 15, wherein the light sensor comprises a camera.

17. The apparatus of claim 15, wherein the light sensor is configured to measure at least an overall color cast of the visible environment.

18. The apparatus of claim 15, wherein the light sensor is configured to identify at least a human subject within the visible environment.

19. The apparatus of claim 18, wherein the light sensor is configured to measure at least a skin tone of the human subject.

20. The apparatus of claim 18, wherein the light sensor is configured to measure at least a plurality of visual background characteristics of the environment behind the human subject.

* * * * *